US006616409B2

(12) United States Patent
Bradbury et al.

(10) Patent No.: US 6,616,409 B2
(45) Date of Patent: Sep. 9, 2003

(54) METHOD OF DESIGNING AN IMPELLER BLADE

(75) Inventors: Phillip James Bradbury, Phoenix, AZ (US); Phep Xuan Nguyen, Windsor Locks, CT (US); Chalmers R. Jenkins, Jr., Tempe, AZ (US)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/222,562

(22) Filed: Aug. 16, 2002

(65) Prior Publication Data

US 2003/0007872 A1 Jan. 9, 2003

Related U.S. Application Data

(63) Continuation of application No. 09/624,583, filed on Jul. 24, 2000, now Pat. No. 6,457,953, which is a continuation of application No. 09/118,843, filed on Jul. 20, 1998, now Pat. No. 6,129,528.

(51) Int. Cl.[7] .............................................. F04D 29/38

(52) U.S. Cl. .............. 416/223 R; 416/243; 416/DIG. 2

(58) Field of Search ................................ 29/889, 889.3; 416/223 R, 242, 243, DIG. 2

(56) References Cited

U.S. PATENT DOCUMENTS

| | | |
|---|---|---|
| 2,609,055 A | 9/1952 | Monroe |
| 2,811,303 A | 10/1957 | Ault et al. |
| 2,974,728 A | 3/1961 | Culp |
| 3,168,235 A | 2/1965 | Valdi |
| 3,169,694 A | 2/1965 | Borchers |
| 4,046,489 A | 9/1977 | Fairchild et al. |
| 4,130,770 A | 12/1978 | Wrobel |
| 4,360,751 A | 11/1982 | Arnold, Jr. et al. |
| 4,413,796 A | 11/1983 | Bousquet |
| 4,431,376 A | 2/1984 | Lubenstein et al. |
| 4,474,534 A | 10/1984 | Thode |
| 4,569,631 A | 2/1986 | Gray, III |
| 4,579,510 A | 4/1986 | Christensen-Dalsgaard |
| 4,656,553 A | 4/1987 | Brown |
| 4,830,574 A | 5/1989 | Wainauski et al. |
| 4,834,617 A * | 5/1989 | Wainauski et al. ..... 416/DIG. 2 |
| 4,840,541 A | 6/1989 | Sakane et al. |
| 4,844,697 A | 7/1989 | Johansen |
| 4,911,612 A | 3/1990 | Rodde et al. |
| 4,941,803 A | 7/1990 | Wainauski et al. |

(List continued on next page.)

OTHER PUBLICATIONS

Casey, A Computational Geometry for the Blades and Internal Flow Channels of Centrifugal Compressors, ASME 82–GT–155 (undated).
Forrest, Interactive Interpolation and approximation by Bezier polynomials, The Computer Journal, vol. 15, No. 1, p. 71–79 (undated—received by Journal May 1971).
Abbott and Von Doenhoff, Theory of Wing Sections, 1949, p. 111–13.
Selby, Standard Mathematical Tables, 1974, p. 627.
Martensen, The Calculation of the Pressure Distribution on a Cascade of Thick Airfoils by Means of Fredholm Integral Equations of the Second Kind, NASA TT F–702, Jul. 1971.

*Primary Examiner*—Edward K. Look
*Assistant Examiner*—Richard A. Edgar
(74) *Attorney, Agent, or Firm*—Schulte Roth & Zabel LLP

(57) ABSTRACT

Impeller blades and a method for designing impeller blades wherein the blades comprise a plurality of specially designed airfoil sections, each section having along substantially the entire length thereof, a cross-sectional shape characterized by a maximum thickness located substantially constantly between about 16% chord to about 23% chord and a maximum camber located substantially constantly between about 40% chord to about 51% chord. The blades are designed so that the axial width of the blades is decreased while maintaining performance parameters and design constraints.

9 Claims, 26 Drawing Sheets

U.S. PATENT DOCUMENTS

| | | |
|---|---|---|
| 4,971,520 A | 11/1990 | Van Houten |
| 5,127,801 A | 7/1992 | Mortensen |
| 5,181,830 A | 1/1993 | Chou |
| 5,244,347 A | 9/1993 | Gallivan et al. |
| 5,273,400 A | 12/1993 | Amr |
| 5,320,493 A | 6/1994 | Shih et al. |
| 5,326,225 A | 7/1994 | Gallivan et al. |
| 5,433,586 A | 7/1995 | Cole |
| 5,513,951 A | 5/1996 | Komoda et al. |
| 5,616,004 A | 4/1997 | Alizadeh |
| 5,659,217 A | 8/1997 | Petersen |
| 5,701,045 A | 12/1997 | Yokozawa et al. |
| 5,730,583 A | 3/1998 | Alizadeh |
| 5,755,557 A | 5/1998 | Alizadeh |
| 5,929,611 A | 7/1999 | Scott et al. |
| 5,930,112 A | 7/1999 | Babinski et al. |
| 5,952,798 A | 9/1999 | Jones et al. |

* cited by examiner

BIPOLER

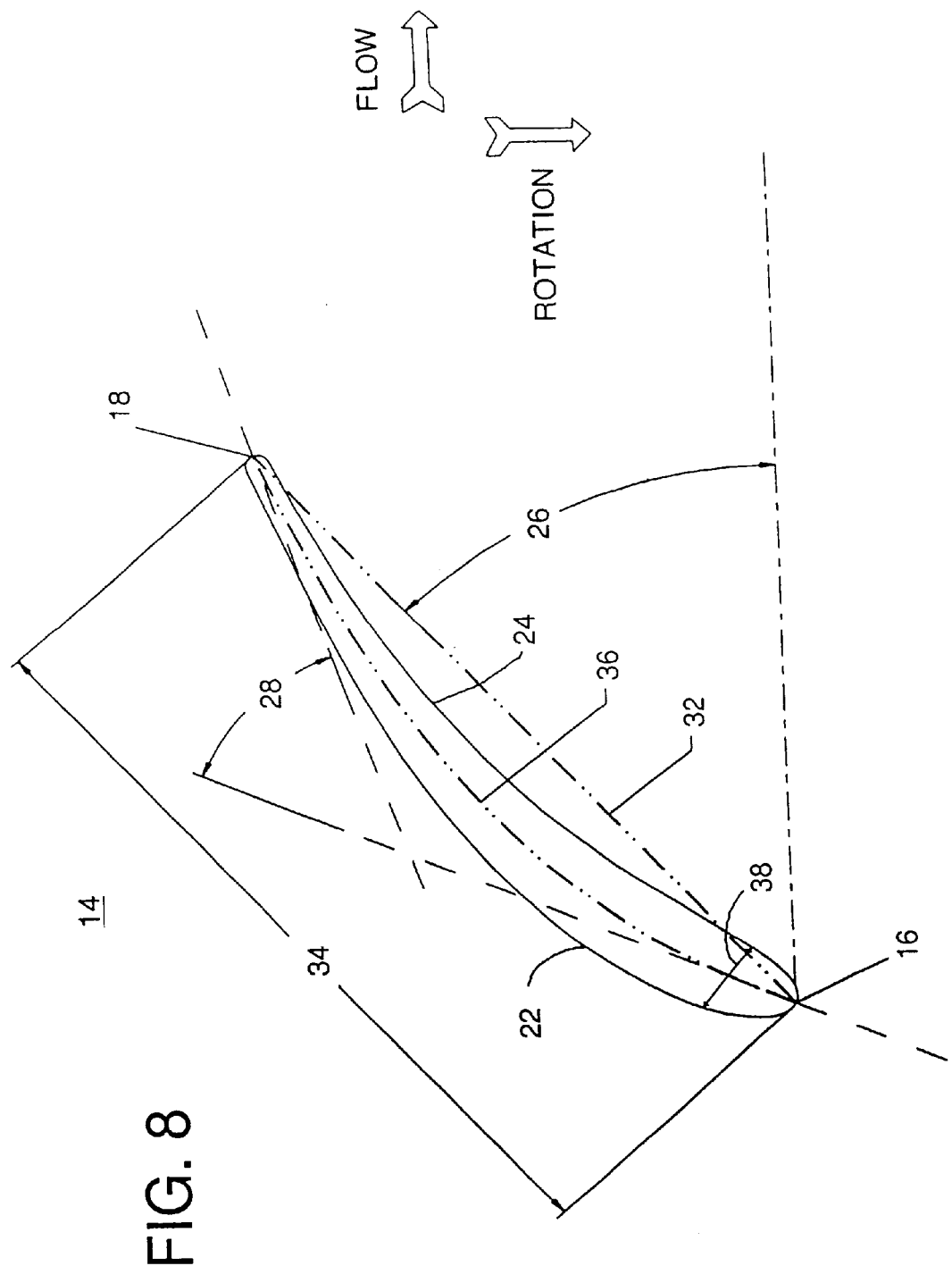

NORMALIZED BEZIER CONTROL POINTS

| | r/rtip = 0.5009 | | | r/rtip = 0.6459 | | |
|---|---|---|---|---|---|---|
| k | $x_k$ | $y_k$ | $t_k$ | $x_k$ | $y_k$ | $t_k$ |
| 0 | 0.00 | 0.00000 | 3.66090 | 0.00 | 0.00000 | 2.96628 |
| 1 | 1.25 | 0.58007 | 5.24729 | 1.25 | 0.40469 | 4.25167 |
| 2 | 2.50 | 1.16014 | 6.46759 | 2.50 | 0.80938 | 5.24043 |
| 3 | 5.00 | 2.32029 | 8.54210 | 5.00 | 1.61876 | 6.92133 |
| 4 | 7.50 | 3.48043 | 12.08097 | 7.50 | 2.42814 | 9.78873 |
| 5 | 10.00 | 4.64057 | 12.08097 | 10.00 | 3.23751 | 9.78873 |
| 6 | 15.00 | 6.96086 | 12.08097 | 15.00 | 4.85627 | 9.78873 |
| 7 | 20.00 | 9.28114 | 12.08097 | 20.00 | 6.47503 | 9.78873 |
| 8 | 30.00 | 12.34440 | 12.08097 | 30.00 | 9.05043 | 9.78873 |
| 9 | 40.00 | 12.34440 | 10.98270 | 40.00 | 9.05043 | 8.89885 |
| 10 | 50.00 | 13.37310 | 7.80992 | 50.00 | 9.80463 | 6.32807 |
| 11 | 60.00 | 12.34440 | 7.80992 | 60.00 | 9.05043 | 6.32807 |
| 12 | 70.00 | 8.22960 | 5.73541 | 70.00 | 6.03362 | 4.64718 |
| 13 | 80.00 | 6.86226 | 3.66090 | 80.00 | 4.64103 | 2.96628 |
| 14 | 90.00 | 3.48391 | 3.29481 | 90.00 | 2.35621 | 2.66965 |
| 15 | 95.00 | 1.79474 | 3.23379 | 95.00 | 1.21381 | 2.62022 |
| 16 | 97.50 | 0.95015 | 3.14227 | 97.50 | 0.64260 | 2.54606 |
| 17 | 98.75 | 0.52786 | 3.09651 | 98.75 | 0.35700 | 2.50898 |
| 18 | 100.00 | 0.00000 | 3.05075 | 100.00 | 0.00000 | 2.47190 |

FIG.13A

NORMALIZED BEZIER CONTROL POINTS

| | r/rtip = 0.7909 | | | r/rtip = 0.8954 | | |
|---|---|---|---|---|---|---|
| k | $x_k$ | $y_k$ | $t_k$ | $x_k$ | $y_k$ | $t_k$ |
| 0 | 0.00 | 0.00000 | 2.66901 | 0.00 | 0.00000 | 2.71440 |
| 1 | 1.25 | 0.28327 | 3.82559 | 1.25 | 0.24026 | 3.89065 |
| 2 | 2.50 | 0.56654 | 4.71526 | 2.50 | 0.48052 | 4.79545 |
| 3 | 5.00 | 1.13309 | 6.22770 | 5.00 | 0.96103 | 6.33361 |
| 4 | 7.50 | 1.69963 | 8.80774 | 7.50 | 1.44155 | 8.95753 |
| 5 | 10.00 | 2.26618 | 8.80774 | 10.00 | 1.92207 | 8.95753 |
| 6 | 15.00 | 3.39926 | 8.80774 | 15.00 | 2.88310 | 8.95753 |
| 7 | 20.00 | 4.53235 | 8.80774 | 20.00 | 3.84414 | 8.95753 |
| 8 | 30.00 | 6.54998 | 8.80774 | 30.00 | 5.39486 | 8.95753 |
| 9 | 40.00 | 6.54998 | 8.00704 | 40.00 | 5.39486 | 8.14321 |
| 10 | 50.00 | 7.09582 | 5.69389 | 50.00 | 5.84443 | 5.79073 |
| 11 | 60.00 | 6.54998 | 5.69389 | 60.00 | 5.39486 | 5.79073 |
| 12 | 70.00 | 4.36666 | 4.18145 | 70.00 | 3.59657 | 4.25257 |
| 13 | 80.00 | 3.09061 | 2.66901 | 80.00 | 2.53886 | 2.71440 |
| 14 | 90.00 | 1.56908 | 2.40211 | 90.00 | 1.28896 | 2.44296 |
| 15 | 95.00 | 0.80831 | 2.35763 | 95.00 | 0.66401 | 2.39772 |
| 16 | 97.50 | 0.42793 | 2.29090 | 97.50 | 0.35153 | 2.32986 |
| 17 | 98.75 | 0.23774 | 2.25754 | 98.75 | 0.19530 | 2.29593 |
| 18 | 100.00 | 0.00000 | 2.22418 | 100.00 | 0.00000 | 2.26200 |

FIG.13B

NORMALIZED BEZIER CONTROL POINTS

| k | $x_k$ | $y_k$ | $t_k$ |
|---|---|---|---|
| | \multicolumn{3}{c|}{r/rtip = 1.0000} | | |

| k | $x_k$ | $y_k$ | $t_k$ |
|---|---|---|---|
| 0 | 0.00 | 0.00000 | 3.06144 |
| 1 | 1.25 | 0.23550 | 4.38806 |
| 2 | 2.50 | 0.47100 | 5.40854 |
| 3 | 5.00 | 0.94201 | 7.14336 |
| 4 | 7.50 | 1.41301 | 10.10275 |
| 5 | 10.00 | 1.88402 | 10.10275 |
| 6 | 15.00 | 2.82603 | 10.10275 |
| 7 | 20.00 | 3.76803 | 10.10275 |
| 8 | 30.00 | 4.93440 | 10.10275 |
| 9 | 40.00 | 4.93440 | 9.18432 |
| 10 | 50.00 | 5.34560 | 6.53107 |
| 11 | 60.00 | 4.93440 | 6.53107 |
| 12 | 70.00 | 3.28960 | 4.79626 |
| 13 | 80.00 | 2.47777 | 3.06144 |
| 14 | 90.00 | 1.25795 | 2.75530 |
| 15 | 95.00 | 0.64803 | 2.70427 |
| 16 | 97.50 | 0.34308 | 2.62774 |
| 17 | 98.75 | 0.19060 | 2.58947 |
| 18 | 100.00 | 0.00000 | 2.55120 |

FIG. 13C

| BLADE DEFINITION | ROOT | | | | TIP |
| --- | --- | --- | --- | --- | --- |
| RADIUS (INCHES) | 1.4175 | 1.8278 | 2.2381 | 2.5340 | 2.8300 |
| NORMALIZED RADIUS | 0.5009 | 0.6459 | 0.7908 | 0.8954 | 1.0000 |
| CHORD LENGTH (INCHES) | 0.7785 | 0.9608 | 1.0678 | 1.0499 | 0.9309 |
| NORMALIZED CHORD | 0.8363 | 1.0321 | 1.1471 | 1.1278 | 1.0000 |
| ASPECT RATIO | 1.8144 | 1.4701 | 1.3228 | 1.3454 | 1.5173 |
| SOLIDITY | 1.1363 | 1.0876 | 0.9871 | 0.8573 | 0.6806 |
| STAGGER ANGLE (DEGREES) | 41.831 | 51.330 | 58.685 | 62.607 | 65.653 |
| CAMBER ANGLE (DEGREES) | 47.788 | 33.879 | 23.537 | 19.760 | 19.339 |
| MAXIMUM CAMBER HEIGHT (INCHES) | 0.084 | 0.076 | 0.060 | 0.049 | 0.040 |
| MAXIMUM CAMBER HEIGHT (%CHORD) | 10.823 | 7.863 | 5.652 | 4.671 | 4.320 |
| LOCATION OF MAXIMUM CAMBER (%CHORD) | 45.284 | 45.284 | 45.284 | 45.284 | 45.284 |
| MAXIMUM THICKNESS (INCHES) | 0.089 | 0.089 | 0.089 | 0.089 | 0.089 |
| MAXIMUM THICKNESS (%CHORD) | 11.392 | 9.230 | 8.305 | 8.446 | 9.526 |
| LOCATION OF MAXIMUM THICKNESS (%CHORD) | 19.174 | 19.174 | 19.174 | 19.174 | 19.174 |
| LEADING-EDGE THICKNESS (%CHORD) | 3.661 | 2.966 | 2.669 | 2.714 | 3.062 |
| TRAILING-EDGE THICKNESS (%CHORD) | 3.051 | 2.472 | 2.224 | 2.262 | 2.551 |
| CIRCUMFERENTIAL STACKING DISTANCE (INCHES) | 0.0000 | 0.1335 | 0.2141 | 0.2235 | 0.1806 |
| NORMALIZED CIRCUMFERENTIAL STACKING DISTANCE | 0.0000 | 0.7392 | 1.1855 | 1.2375 | 1.0000 |
| AXIAL STACKING DISTANCE (INCHES) | 0.0000 | -0.0419 | -0.0156 | 0.0216 | 0.0800 |
| NORMALIZED AXIAL STACKING DISTANCE | 0.0000 | -0.5238 | -0.1950 | 0.2700 | 1.0000 |

FIG. 20

NORMALIZED BLADE SURFACE COORDINATES
r/rtip = 0.5009

| # | $X_{UPPER}/C$ | $Y_{UPPER}/C$ | $X_{LOWER}/C$ | $Y_{LOWER}/C$ |
|---|---|---|---|---|
| 1 | 0.00000 | 0.00000 | 0.00000 | 0.00000 |
| 2 | −0.00164 | 0.00733 | 0.00538 | −0.00793 |
| 3 | 0.00112 | 0.02029 | 0.01684 | −0.01404 |
| 4 | 0.00932 | 0.03584 | 0.03360 | −0.01692 |
| 5 | 0.02109 | 0.05019 | 0.05180 | −0.01640 |
| 6 | 0.03931 | 0.06661 | 0.07545 | −0.01370 |
| 7 | 0.06421 | 0.08411 | 0.10315 | −0.00822 |
| 8 | 0.09831 | 0.10227 | 0.13646 | 0.00050 |
| 9 | 0.14433 | 0.12045 | 0.17809 | 0.01242 |
| 10 | 0.20666 | 0.13769 | 0.23280 | 0.02722 |
| 11 | 0.29321 | 0.15170 | 0.30878 | 0.04402 |
| 12 | 0.40785 | 0.15637 | 0.41136 | 0.05873 |
| 13 | 0.48494 | 0.15187 | 0.48213 | 0.06348 |
| 14 | 0.56303 | 0.14173 | 0.55559 | 0.06390 |
| 15 | 0.64006 | 0.12684 | 0.62986 | 0.05993 |
| 16 | 0.71399 | 0.10868 | 0.70267 | 0.05211 |
| 17 | 0.78256 | 0.08915 | 0.77127 | 0.04156 |
| 18 | 0.84321 | 0.07028 | 0.83245 | 0.02976 |
| 19 | 0.89333 | 0.05387 | 0.88311 | 0.01831 |
| 20 | 0.93118 | 0.04111 | 0.92126 | 0.00858 |
| 21 | 0.95695 | 0.03225 | 0.94706 | 0.00135 |
| 22 | 0.97313 | 0.02657 | 0.96313 | −0.00349 |
| 23 | 0.98367 | 0.02280 | 0.97349 | −0.00677 |
| 24 | 0.99251 | 0.01884 | 0.98231 | −0.00908 |
| 25 | 0.99912 | 0.01295 | 0.99065 | −0.00883 |
| 26 | 1.00154 | 0.00617 | 0.99676 | −0.00546 |
| 27 | 1.00000 | 0.00000 | 1.00000 | 0.00000 |

FIG. 21A

NORMALIZED BLADE SURFACE COORDINATES
$r/r_{tip} = 0.6459$

| # | $X_{UPPER}/C$ | $Y_{UPPER}/C$ | $X_{LOWER}/C$ | $Y_{LOWER}/C$ |
|---|---|---|---|---|
| 1 | 0.00000 | 0.00000 | 0.00000 | 0.00000 |
| 2 | −0.00057 | 0.00593 | 0.00353 | −0.00679 |
| 3 | 0.00305 | 0.01558 | 0.01204 | −0.01235 |
| 4 | 0.01137 | 0.02663 | 0.02502 | −0.01565 |
| 5 | 0.02239 | 0.03650 | 0.03950 | −0.01647 |
| 6 | 0.04094 | 0.04910 | 0.06167 | −0.01599 |
| 7 | 0.06557 | 0.06248 | 0.08862 | −0.01328 |
| 8 | 0.09882 | 0.07623 | 0.12200 | −0.00765 |
| 9 | 0.14379 | 0.08999 | 0.16473 | 0.00103 |
| 10 | 0.20537 | 0.10319 | 0.22185 | 0.01256 |
| 11 | 0.29210 | 0.11407 | 0.30204 | 0.02621 |
| 12 | 0.40847 | 0.11762 | 0.41074 | 0.03848 |
| 13 | 0.48605 | 0.11394 | 0.48434 | 0.04248 |
| 14 | 0.56498 | 0.10580 | 0.56036 | 0.04300 |
| 15 | 0.64310 | 0.09394 | 0.63677 | 0.04002 |
| 16 | 0.71816 | 0.07960 | 0.71120 | 0.03406 |
| 17 | 0.78765 | 0.06441 | 0.78079 | 0.02610 |
| 18 | 0.84872 | 0.05007 | 0.84229 | 0.01738 |
| 19 | 0.89859 | 0.03800 | 0.89258 | 0.00916 |
| 20 | 0.93558 | 0.02899 | 0.92982 | 0.00240 |
| 21 | 0.96021 | 0.02299 | 0.95452 | −0.00245 |
| 22 | 0.97534 | 0.01928 | 0.96961 | −0.00560 |
| 23 | 0.98497 | 0.01688 | 0.97912 | −0.00767 |
| 24 | 0.99235 | 0.01445 | 0.98650 | −0.00886 |
| 25 | 0.99813 | 0.01031 | 0.99327 | −0.00797 |
| 26 | 1.00065 | 0.00511 | 0.99791 | −0.00470 |
| 27 | 1.00000 | 0.00000 | 1.00000 | 0.00000 |

FIG. 21B

NORMALIZED BLADE SURFACE COORDINATES
r/rtip = 0.7908

| # | $X_{UPPER}/C$ | $Y_{UPPER}/C$ | $X_{LOWER}/C$ | $Y_{LOWER}/C$ |
|---|---|---|---|---|
| 1 | 0.00000 | 0.00000 | 0.00000 | 0.00000 |
| 2 | −0.00002 | 0.00532 | 0.00261 | −0.00633 |
| 3 | 0.00405 | 0.01350 | 0.00976 | −0.01180 |
| 4 | 0.01246 | 0.02246 | 0.02106 | −0.01554 |
| 5 | 0.02316 | 0.03013 | 0.03388 | −0.01720 |
| 6 | 0.04207 | 0.04036 | 0.05523 | −0.01835 |
| 7 | 0.06677 | 0.05104 | 0.08164 | −0.01775 |
| 8 | 0.09972 | 0.06171 | 0.11492 | −0.01464 |
| 9 | 0.14420 | 0.07212 | 0.15811 | −0.00877 |
| 10 | 0.20533 | 0.08191 | 0.21639 | −0.00027 |
| 11 | 0.29193 | 0.08973 | 0.29865 | 0.01036 |
| 12 | 0.40884 | 0.09169 | 0.41037 | 0.02047 |
| 13 | 0.48655 | 0.08831 | 0.48539 | 0.02408 |
| 14 | 0.56581 | 0.08151 | 0.56268 | 0.02509 |
| 15 | 0.64440 | 0.07187 | 0.64012 | 0.02345 |
| 16 | 0.71997 | 0.06045 | 0.71531 | 0.01955 |
| 17 | 0.78988 | 0.04857 | 0.78535 | 0.01415 |
| 18 | 0.85113 | 0.03762 | 0.84695 | 0.00821 |
| 19 | 0.90087 | 0.02868 | 0.89702 | 0.00265 |
| 20 | 0.93743 | 0.02222 | 0.93380 | −0.00185 |
| 21 | 0.96150 | 0.01808 | 0.95797 | −0.00502 |
| 22 | 0.97614 | 0.01559 | 0.97261 | −0.00705 |
| 23 | 0.98535 | 0.01402 | 0.98176 | −0.00836 |
| 24 | 0.99210 | 0.01236 | 0.98851 | −0.00894 |
| 25 | 0.99754 | 0.00909 | 0.99456 | −0.00766 |
| 26 | 1.00018 | 0.00463 | 0.99850 | −0.00438 |
| 27 | 1.00000 | 0.00000 | 1.00000 | 0.00000 |

FIG. 21C

NORMALIZED BLADE SURFACE COORDINATES
r/rtip = 0.8954

| # | $X_{UPPER}/C$ | $Y_{UPPER}/C$ | $X_{LOWER}/C$ | $Y_{LOWER}/C$ |
|---|---|---|---|---|
| 1 | 0.00000 | 0.00000 | 0.00000 | 0.00000 |
| 2 | 0.00015 | 0.00543 | 0.00245 | −0.00654 |
| 3 | 0.00456 | 0.01368 | 0.00954 | −0.01240 |
| 4 | 0.01340 | 0.02259 | 0.02092 | −0.01665 |
| 5 | 0.02452 | 0.03007 | 0.03391 | −0.01884 |
| 6 | 0.04367 | 0.03972 | 0.05514 | −0.02078 |
| 7 | 0.06861 | 0.04958 | 0.08145 | −0.02110 |
| 8 | 0.10173 | 0.05913 | 0.11469 | −0.01911 |
| 9 | 0.14620 | 0.06809 | 0.15790 | −0.01461 |
| 10 | 0.20706 | 0.07612 | 0.21624 | −0.00770 |
| 11 | 0.29306 | 0.08204 | 0.29855 | 0.00125 |
| 12 | 0.40901 | 0.08262 | 0.41020 | 0.01019 |
| 13 | 0.48630 | 0.07908 | 0.48527 | 0.01374 |
| 14 | 0.56519 | 0.07269 | 0.56254 | 0.01525 |
| 15 | 0.64350 | 0.06399 | 0.63990 | 0.01463 |
| 16 | 0.71889 | 0.05388 | 0.71497 | 0.01213 |
| 17 | 0.78871 | 0.04349 | 0.78489 | 0.00831 |
| 18 | 0.84996 | 0.03399 | 0.84643 | 0.00391 |
| 19 | 0.89976 | 0.02628 | 0.89652 | −0.00033 |
| 20 | 0.93644 | 0.02076 | 0.93340 | −0.00384 |
| 21 | 0.96066 | 0.01724 | 0.95769 | −0.00637 |
| 22 | 0.97541 | 0.01513 | 0.97245 | −0.00799 |
| 23 | 0.98470 | 0.01380 | 0.98169 | −0.00906 |
| 24 | 0.99160 | 0.01232 | 0.98859 | −0.00945 |
| 25 | 0.99722 | 0.00916 | 0.99472 | −0.00796 |
| 26 | 1.00003 | 0.00471 | 0.99862 | −0.00450 |
| 27 | 1.00000 | 0.00000 | 1.00000 | 0.00000 |

FIG. 21D

NORMALIZED BLADE SURFACE COORDINATES
r/rtip = 1.0000

| # | $X_{UPPER}/C$ | $Y_{UPPER}/C$ | $X_{LOWER}/C$ | $Y_{LOWER}/C$ |
|---|---|---|---|---|
| 1 | 0.00000 | 0.00000 | 0.00000 | 0.00000 |
| 2 | 0.00018 | 0.00621 | 0.00274 | −0.00746 |
| 3 | 0.00514 | 0.01586 | 0.01079 | −0.01447 |
| 4 | 0.01507 | 0.02637 | 0.02371 | −0.01981 |
| 5 | 0.02757 | 0.03517 | 0.03844 | −0.02274 |
| 6 | 0.04710 | 0.04531 | 0.06005 | −0.02523 |
| 7 | 0.07255 | 0.05535 | 0.08658 | −0.02599 |
| 8 | 0.10619 | 0.06474 | 0.11987 | −0.02446 |
| 9 | 0.15092 | 0.07313 | 0.16285 | −0.02056 |
| 10 | 0.21140 | 0.08015 | 0.22046 | −0.01444 |
| 11 | 0.29594 | 0.08465 | 0.30118 | −0.00635 |
| 12 | 0.40909 | 0.08385 | 0.41012 | 0.00215 |
| 13 | 0.48526 | 0.07979 | 0.48413 | 0.00598 |
| 14 | 0.56302 | 0.07320 | 0.56031 | 0.00815 |
| 15 | 0.64027 | 0.06461 | 0.63663 | 0.00852 |
| 16 | 0.71478 | 0.05481 | 0.71079 | 0.00722 |
| 17 | 0.78401 | 0.04481 | 0.78008 | 0.00461 |
| 18 | 0.84506 | 0.03563 | 0.84138 | 0.00125 |
| 19 | 0.89512 | 0.02811 | 0.89170 | −0.00226 |
| 20 | 0.93243 | 0.02263 | 0.92917 | −0.00536 |
| 21 | 0.95741 | 0.01907 | 0.95420 | −0.00771 |
| 22 | 0.97283 | 0.01690 | 0.96961 | −0.00928 |
| 23 | 0.98268 | 0.01552 | 0.97940 | −0.01035 |
| 24 | 0.99047 | 0.01387 | 0.98718 | −0.01073 |
| 25 | 0.99682 | 0.01033 | 0.99408 | −0.00901 |
| 26 | 1.00001 | 0.00531 | 0.99847 | −0.00508 |
| 27 | 1.00000 | 0.00000 | 1.00000 | 0.00000 |

FIG. 21E

METHOD OF DESIGNING AN IMPELLER BLADE

This application is a continuation of U.S. application Ser. No. 09/624,583 filed on Jul. 24, 2000, U.S. Pat. No. 6,457,953 which is a continuation of U.S. application Ser. No. 09/118,843 filed on Jul. 20, 1998, which issued as U.S. Pat. No. 6,129,528 on Oct. 6, 2000.

FIELD OF THE INVENTION

The present invention relates to an axial flow fan, and more particularly to an improved printed circuit board and fan housing, and improved blades comprising a new airfoil family having the advantages of decreasing the axial width of the axial flow fan while maintaining its performance parameters and design constraints. The axial flow fan of the present invention is especially suitable for use in cooling electronic components.

BACKGROUND OF THE INVENTION

A conventional axial flow fan is generally composed of a driving motor, a cylindrical central hub section, a plurality of blades, and a housing for encasing the fan. Each of the blades extends radially outward from the central hub section of the fan. A motor shaft of the driving motor is attached to the hub section at a central aperture and thus the hub section may be rotated by the driving motor via the motor shaft. In such an arrangement, the hub section together with the blades rotate about an axis of the outer casing in order to force air flow from an inlet area to an outlet area of the fan. The motor rotates the blades of the fan via the motor shaft so as to make the blades generate a lifting force which is, in a form, the fan pressure and air flow.

Axial flow fans such as Model No. 5920 produced by IMC Magnetics Corporation, the assignee of the present application, are known which utilize a unipolar winding employing a four pole motor where only two of the windings are ON at a time. These fans employ circuitry including circuit elements of a substantial size, such as an inductor to reduce the starting current, transistors large enough to handle the power levels, and large clamping diodes needed to protect the transistors. Such axial flow fans cannot handle input voltages in the range of 57V–64V, are limited to a maximum input voltage of about 56V, and are more typically operated at an input voltage of about 48V.

Model No. 5920 measures two inches in axial width due to both the large size of the diodes, inductors, and transistors used, as well as the number of turns required for a unipolar winding. Furthermore, the axial width of Model No. 5920 is attributed to its 5 blades wherein each blade is characterized by a symmetrical cross-section approximately described as curved flat plates. As such, these blades are not aerodynamically efficient and thus require a larger chord length to meet the performance requirements forcing the dimensions of Model No. 5920 to a two inch axial width.

With the continual increase in the density and load-carrying capability of electronic components on circuit boards, and the consequential increase in heating problems resulting therefrom, axial flow fans are increasingly being used in an effort to combat such heating problems. During the design of such axial flow fans, it is important to make them as small and as cost-effective as possible. In particular, it is important to reduce the axial width of such a fan as much as possible. For example, the two inches axial width of Model No. 5920 is wider than optimal for use as an axial flow fan for cooling electronic components. Thus, it is desirable to reduce its size while maintaining its performance parameters and design constraints.

One method to reduce the axial width of such a fan is to eliminate large electronic components and reduce the size of other components while maintaining performance parameters and design constraints. Furthermore, the housing of the axial flow fan may also be utilized to reduce the axial width.

In addition, in order to reduce the axial width of an axial flow fan, it is desirable to utilize narrow chord blades. However, the use of such narrow chord blades results in decreased performance, particularly a decrease in the fan pressure and air flow. These decreases in performance must be offset by varying the design parameters. It is known that, among other factors, the chord length, camber angle, stagger angle, and the cross-sectional shape of the blades are possible factors affecting the performance of the fan. In addition, it is known that by varying the work distribution along a blade's span, the chord length may be varied along the blade span while maintaining performance parameters.

However, no invention in the prior art discloses a combination of these and other factors to formulate a blade which delivers the desired performance while reducing the axial width to that of the present invention.

For example, in theory, the larger the camber angle, the greater the lift force under a constant angle of attack. However, if the camber angle is too large the blade may stall resulting in a decrease in performance and an increase in noise signature. Consequently, the camber angle must be designed to the proper value.

By way of a further example, a decrease in the work distribution at a radial location will allow for a decrease in chord length with a resultant decrease in velocity exiting the blade at that radial location. Thus, it is desirable to minimize the work distribution at the hub section (root of the blade), since this affects axial width, and to maximize the work distribution at the tip of the blade to deliver the greatest blade exit velocity at the tip. Such an approach was disclosed in U.S. Pat. No. 5,320,493. However, this approach may lead to an intolerable increase in the noise signature of the fan due to the increase in tip velocity exiting the blade as well as an increase in turbulent air exiting the tip of the blades. Thus, it is desirable to locate the maximum work distribution at some favorable location between the root portion and the tip portion.

Furthermore, the cross-sectional shape of the blade affects its velocity distribution. Circular arc profiles, such as NACA series 65 airfoils, exhibit a velocity profile which results in a rapid decrease in the velocity along the suction surface at the trailing edge of the blade. Such a large deceleration gradient results in a mote unstable boundary layer, promoting boundary layer separation and hence resulting in loss of lift and greater turbulent air exiting the blade. Thus, the velocity profile of the cross-sectional airfoil must be designed so that a favorable velocity profile is achieved.

Various prior U.S. patents had been developed in this field. For example, U.S. Pat. No. 4,971,520, No. 4,569,631, No. 5,244,347, No. 5,326,225, No. 5,513,951, No. 5,320,493, No. 5,181,830, No. 5,273,400, No. 2,811,303, and No. 5,730,483 disclose axial flow fans. However, the fans disclosed in these patents have not effectively combined the above parameters to overcome the problems described above. In particular no invention discloses a family of airfoil profiles or a blade which delivers the performance of the present invention while reducing the axial width of the fan.

SUMMARY OF THE INVENTION

Accordingly, it is an object of this invention to provide an axial flow fan with reduced axial width while maintaining performance parameters and design constraints.

An additional object is to provide an axial flow fan with reduced axial width by eliminating large electronic circuit components.

It is yet another object of the invention to provide an axial flow fan that is capable of operating from a starting voltage in the range of about 28V–64V.

It is a further object of the invention to provide an axial flow fan with reduced axial width by employing the housing as a heat sink.

It is still a further object of the invention to provide an axial flow fan with reduced axial width by employing a voltage regulator IC.

It is an additional object of the invention to provide an axial flow fan with reduced axial width by employing a bipolar winding motor.

It is an additional object of the invention to provide a blade incorporating a family of airfoil sections capable of reducing the axial width of an axial flow fan while maintaining performance parameters and design constraints.

It is yet another object of the invention to provide a blade incorporating a family of airfoil sections which allow for the reduction of the axial width of an axial fan while locating the maximum work distribution between the root portion and the tip portion of the blade.

It is yet another object of the invention to provide a blade incorporating a family of airfoil sections which allow for the reduction of the axial width of an axial fan while maintaining a favorable velocity profile over the suction side of the blade.

These and other objects are realized by a stator comprising a core and at least one winding, and a printed circuit board having circuitry for operating the motor, the printed circuit board secured to the stator and electrically connected to the at least one winding of the stator. The circuitry includes a voltage regulator.

Also provided is an axial flow fan comprising: a motor comprising a magnet, a yoke, and a stator assembly. The stator assembly includes a core, at least one winding, and a printed circuit board secured to the core and electrically connected to the one winding. The axial flow fan further comprises an impeller and a fan housing, wherein the housing also functions as a heat sink.

These and other objects are further realized by: a blade for an impeller having a root portion, a tip portion, a leading edge, a trailing edge, the blade having a cross-sectional shape, taken anywhere along a radius of the blade, characterized by a maximum thickness located substantially constantly between about 19% chord to about 20% chord and a maximum camber located substantially constantly between about 45% chord to about 46% chord; an impeller consisting of at least thirteen of such circumferentially spaced, radially extending blades coupled to a circular band at the root portion of the blade; an axial flow fan comprising such an impeller, a driving motor, a yoke section that is rotatable about an axis and driven by the driving motor, and a fan housing that concentrically surrounds such an impeller; and a blade for an impeller having a root portion, a tip portion, a leading edge, a trailing edge, the blade being characterized in plan form wherein the blade is varied from the root portion to the tip portion with a maximum chord located between the root portion and the tip portion, the leading edge and the trailing edge of the blade are convex from the root portion to the tip portion.

As such, the novel circuitry, fan housing, and blade of the invention provide for a reduced axial width of an axial flow fan while maintaining its performance parameters and design constraints. These and other objects, features, and advantages of the present invention will become more apparent in light of the following detailed description and accompanying drawings.

BRIEF DESCRIPTION OF THE DRAWINGS

The above and related objects, features and advantages of the present invention will be more fully understood by reference to the following detailed description of the presently preferred, albeit illustrative, embodiment of the present invention when taken in conjunction with the accompanying drawings wherein:

FIG. 8 is a cross-sectional view a blade in accordance with the present invention;

FIGS. 13A–C are tabular representations of the optimized normalized Bezier control points for the five airfoil sections of the preferred embodiment in accordance with the present invention;

FIG. 20 is a tabular representation of the optimized values describing the five airfoil sections of the preferred embodiment in accordance with the present invention; and FIGS. 21A–E are tabular representations of the normalized surface coordinates of the preferred embodiment in accordance with the present invention.

DETAILED DESCRIPTION OF THE PREFERRED EMBODIMENT

Figure 1:
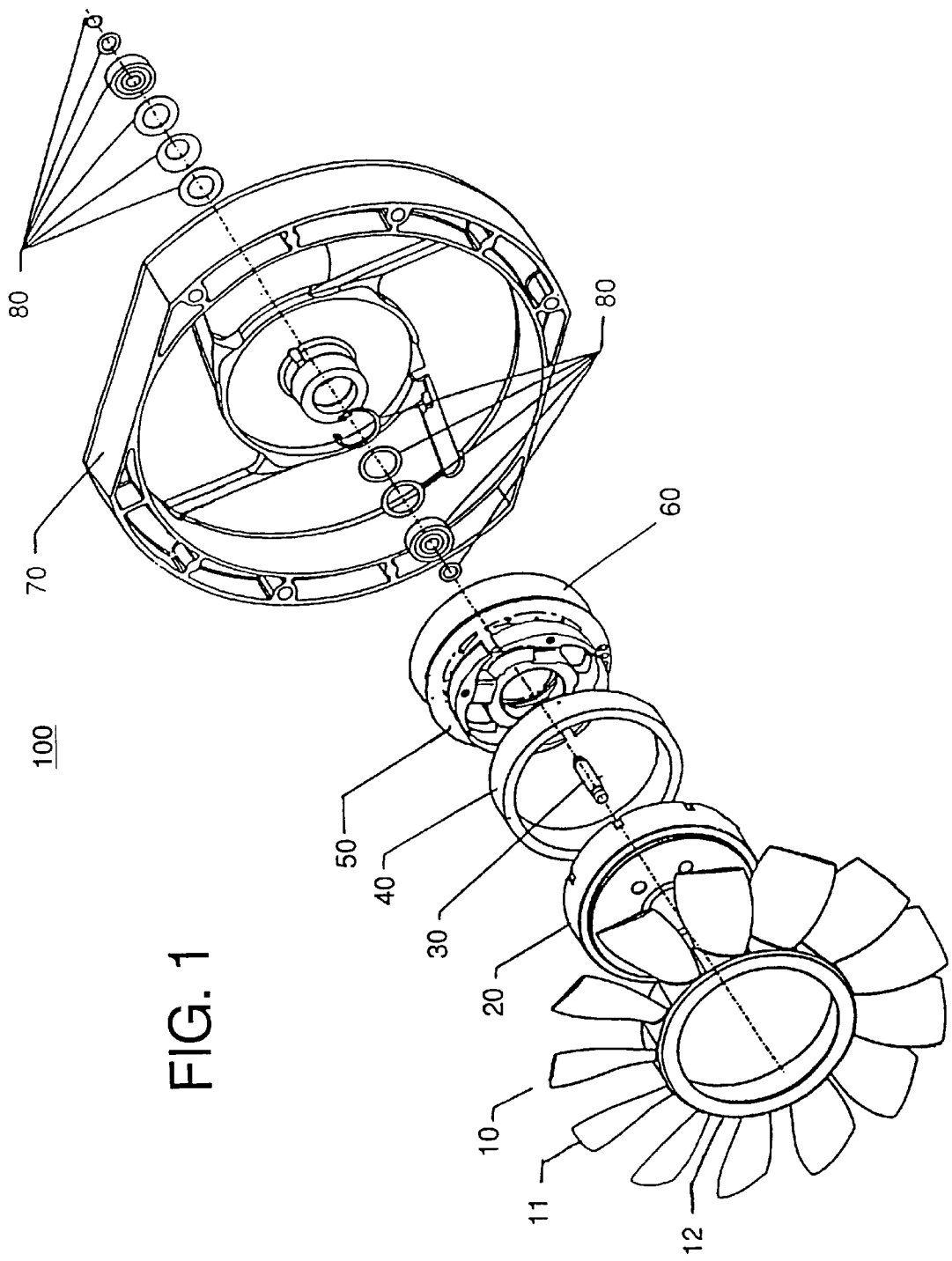
FIG. 1 is an exploded perspective view of an axial flow fan embodying the invention.
Figure 2:
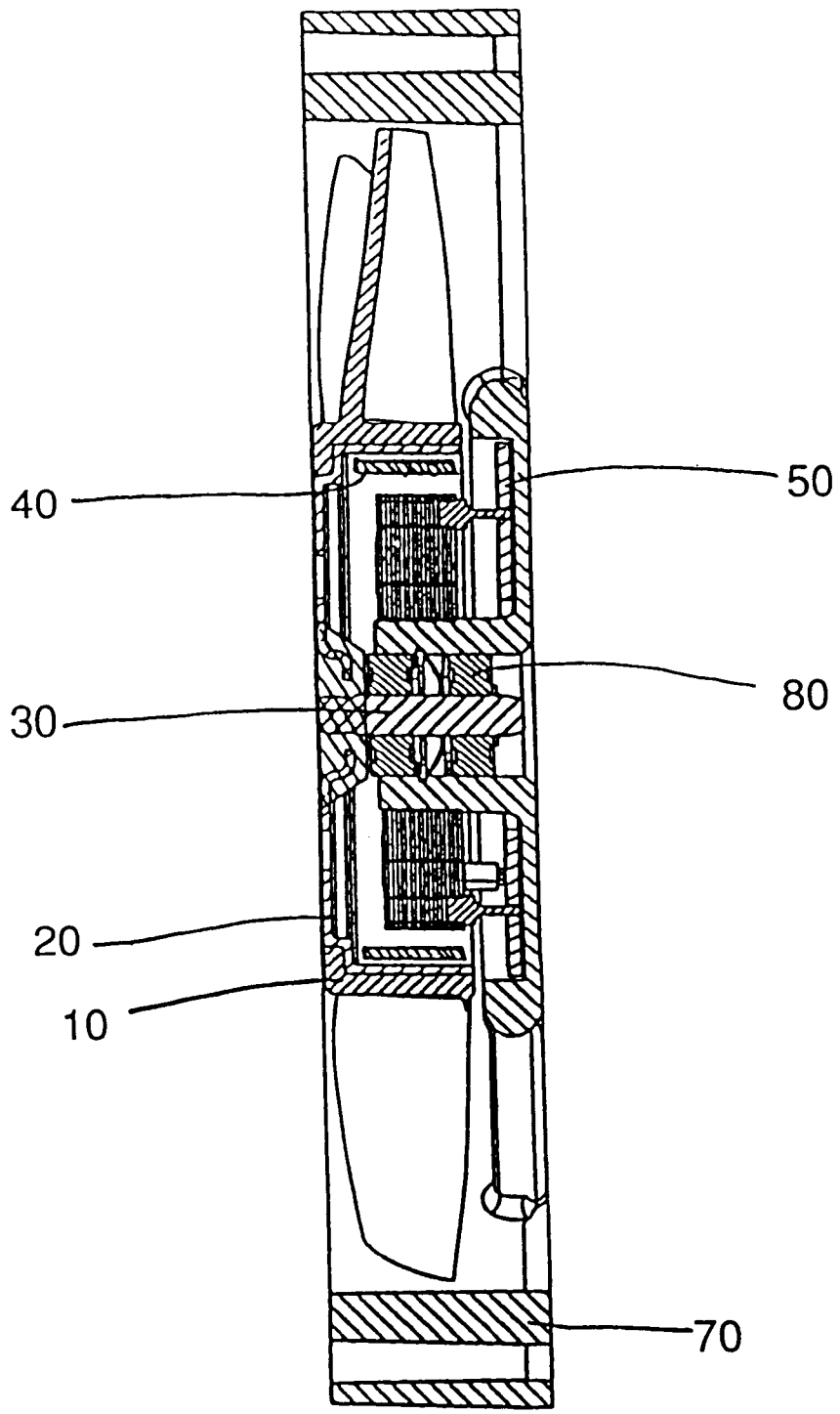
FIG. 2 is a cross-sectional assembled view thereof.

Referring now to the drawings, and in particular to FIGS. 1 and 2, wherein illustrated is an axial flow fan 100, comprising an impeller 10, embodying a preferred embodiment of the present invention for generating airflow when rotated, a yoke 20 mounted in impeller 10, a shaft 30 coupled to yoke 20, a permanent magnet 40 mounted in yoke 20, a stator assembly 50, a fan housing 70, an insulation sheet 60 for electrically insulating the base within stator assembly 50 from fan housing 70, and bearings and mounting hardware 80 which serve to secure the shaft 30 to housing 70 while allowing shaft 30 to freely rotate, thereby rotating impeller 10. The impeller 10 comprises a plurality of blades 11 equally spaced and circumferentially mounted on circular band 12. The permanent magnet 40 mounted in yoke 20, when combined with stator assembly 50, forms an electrical motor which turns impeller 10 when a voltage is applied to an exciting circuit on the printed circuit board within stator assembly 50. The construction of stator assembly 50 is fully described in a co-pending patent application filed concurrently herewith and owned by the assignee of this application, which is incorporated herein by reference, entitled "Stator Mounting Method and Apparatus for a Motor".

Figure 3:
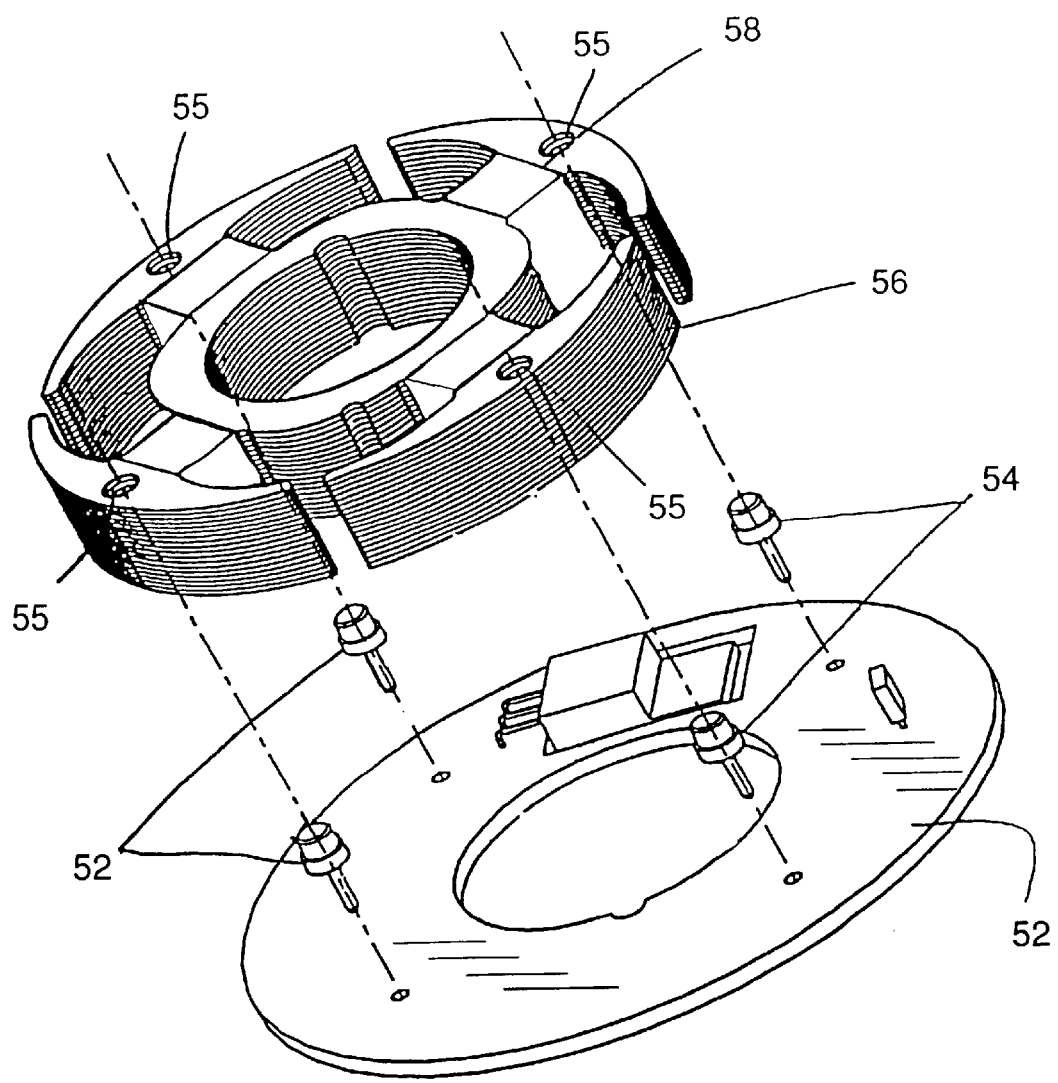
FIG. 3 is an exploded perspective view of the stator assembly.

FIG. 3 depicts the stator assembly 50, comprising a base 52, four insulating pins 54, a stator core 56 and windings 58. In the preferred embodiment, base 52 is a printed circuit board including the circuitry for exciting and operating the motor.

Figure 4:
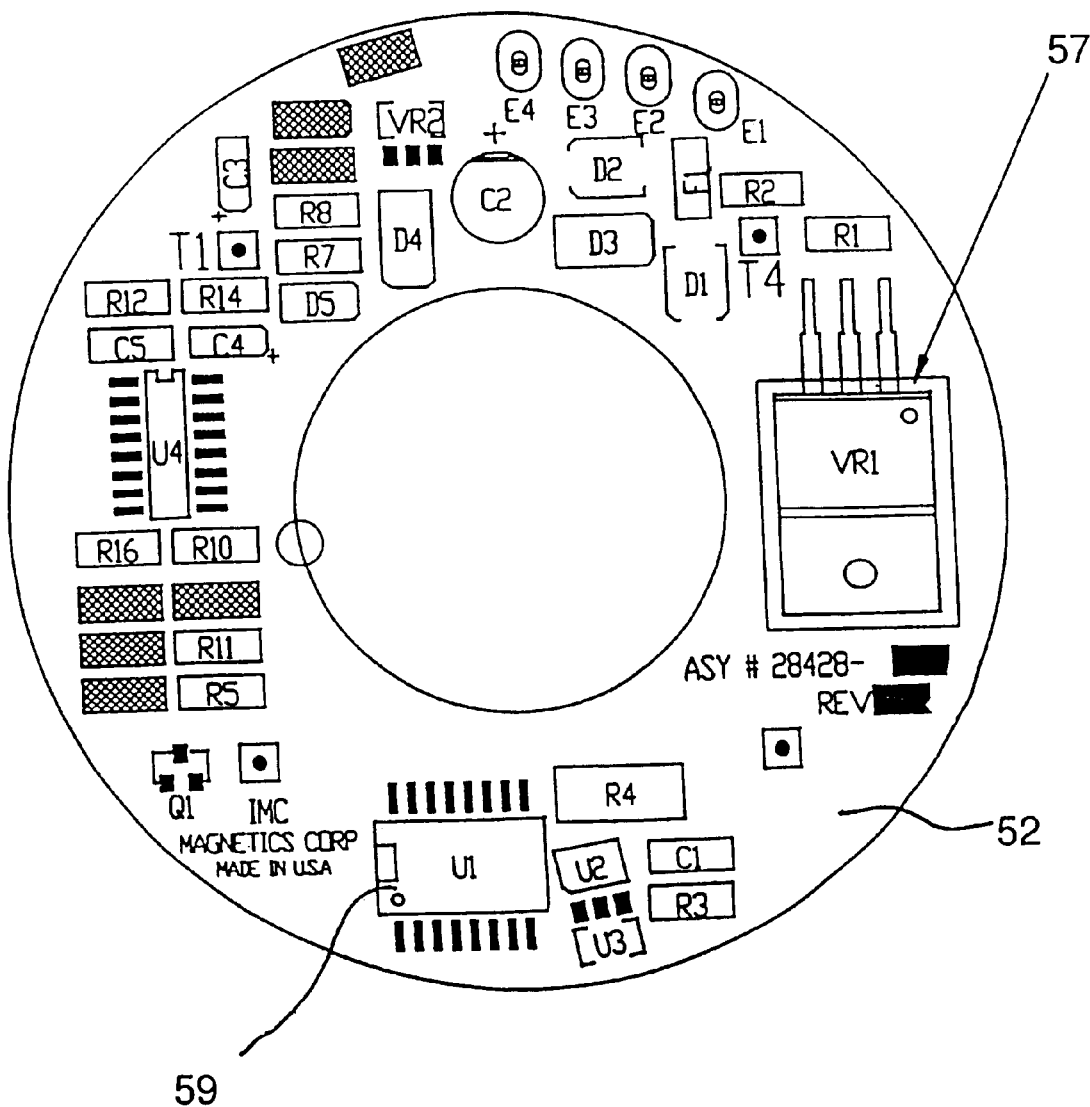
FIG. 4 is a top view of the printed circuit board base 52.
Figure 7:
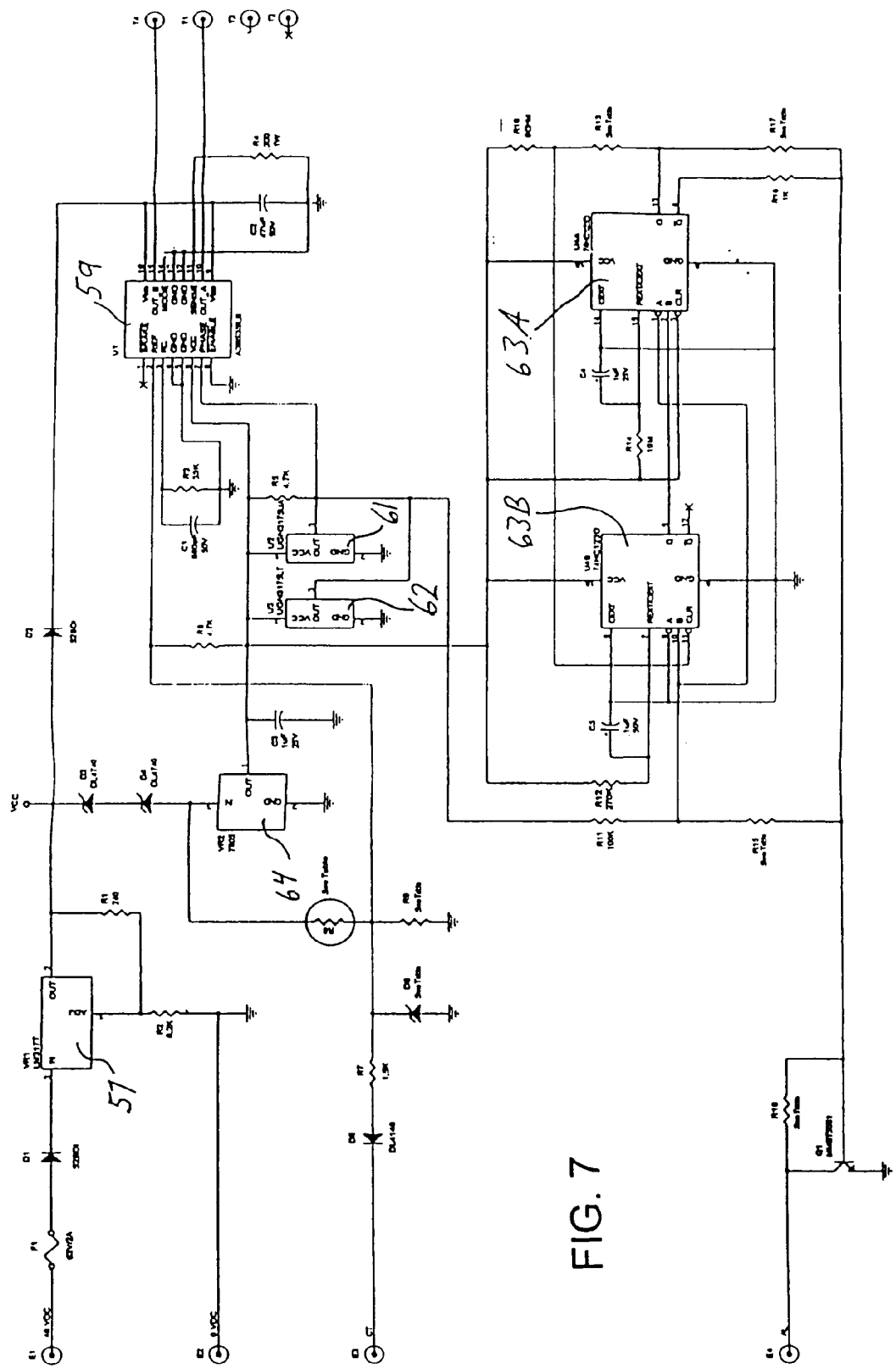
FIG. 7 is a circuit diagram of the circuitry for operating the motor.

The base 52 as shown in FIG. 4 is a printed circuit board which has mounted thereon the circuitry for operating the motor according to the circuit diagram shown in FIG. 7. The motor is a DC brushless auto restart type. The circuitry includes integrated circuits such as the voltage regulator 57 and the driver IC 59 for driving a motor with a bipolar winding. Power is supplied at terminals E1–E2. Terminals E3 and E4 are input signals for the control speed and an alarm signal. Power is output at terminals T1 and T4 on FIG. 7 to the winding terminals T1 and T4.

Figure 5:
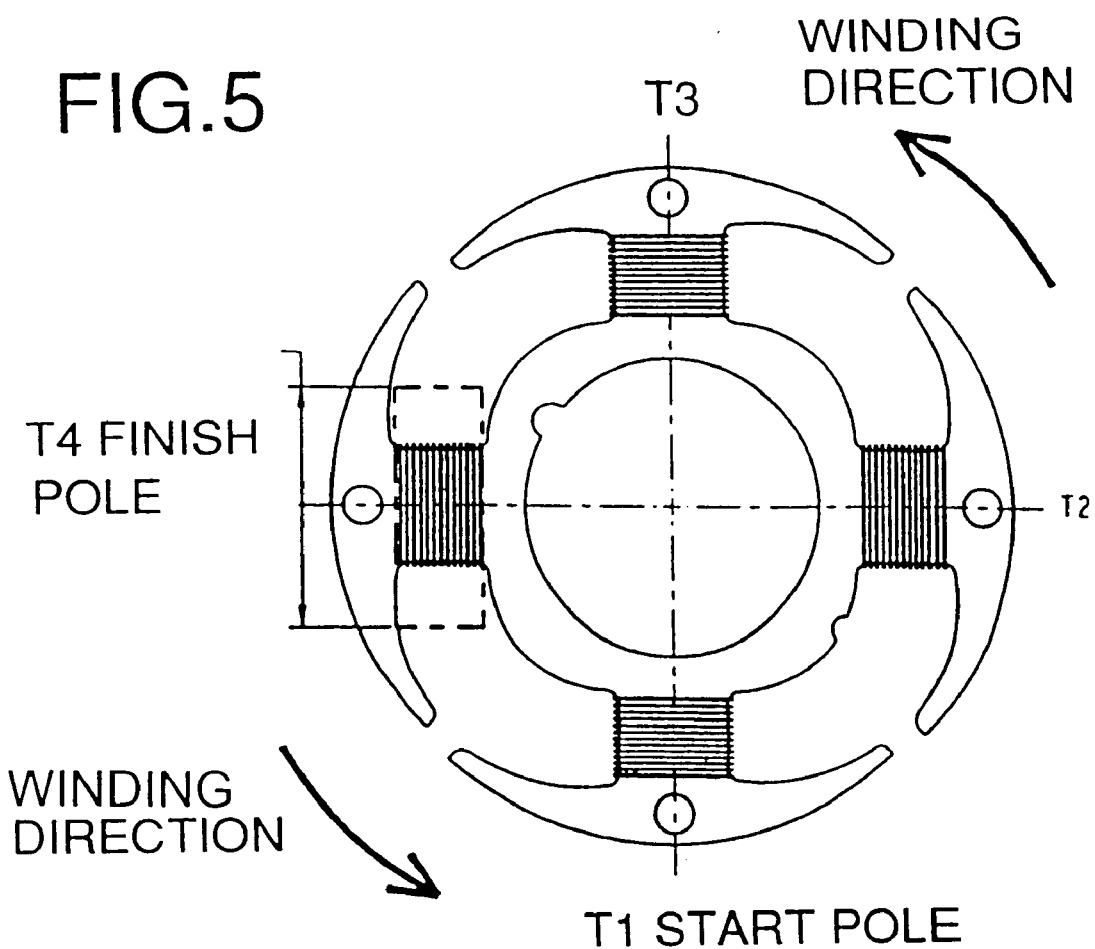
FIG. 5 is a top view of the stator core and winding.
Figure 6:
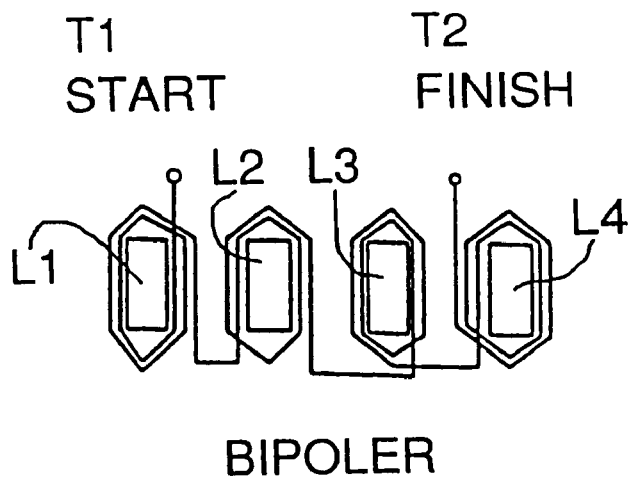
FIG. 6 is a view of the manner of winding the windings on the stator core for a bipolar winding.

The windings 58 are wound so that the motor is a bipolar motor as shown in FIG. 6. With reference to FIGS. 5 and 6, the first loop L1 is wound about pole T1, the second loop L2 is wound about pole T2, the third loop L3 is wound about pole T3, and the fourth loop L4 is wound about pole T4. For a four pole motor all of the poles are ON or OFF at the same time. Since a bipolar winding requires less turns and has a lower profile, when compared to a unipolar winding, a fan with a reduced width can be achieved with the bipolar winding.

As shown in FIG. 7, the circuitry for operating the motor includes the adjustable voltage regulator (IC VR1) 57 which may be Part No. NJM317F-ND sold/manufactured by Digi-Key/JRC. The circuit further includes the voltage regulator (IC VR2) 64 such as Part No. NJM78L05UA-ND sold/manufactured by Digi-Key/JRC. Additionally, the operating circuitry includes the IC 59 which is a full-bridge pulse width modulator motor driver such as Part No. A3953SLB manufactured by Allegero. Further, hall-effect IC 61 may be Part No. UGN3175UA manufactured by Allegero. The hall-effect IC 62 may be Part No. UGN3175LT manufactured by Allegero. Circuits 63A and 63B are CMOS dual retriggerable multi-vibrator ICs and each may be Part No. 74HC123D manufactured by Philips. Optionally, the following parts illustrated in FIG. 7 may not be installed: R6, D6, R9, R13, R15, R17 and R18.

The voltage regulator 57 permits use of an input voltage in the range of about 28V to 64V, a greater range than in other fans such as the Model No. 5920 fan mentioned in the section above entitled "Background of the Invention". The input and output voltages of the voltage regulator are different. The voltage regulator adjusts the voltage at the output to be appropriate for the IC circuitry on the output side of the voltage regulator. Delivering low voltages at the output of the voltage regulator to all resistors, transistors, diodes, and capacitors permits the use of small components reducing the size of the circuitry so that it may be employed in a fan of a reduced width. In the invention there is no need for the large clamping diodes such as Part No. V03C manufactured by Hitachi employed in the Model No. 5920 axial flow fan. Four large transistors such as Part Nos. 25B1203-5 manufactured by Sanyo employed in the circuitry of the Model No. 5920 fan in order to handle the heat and power of the high voltage levels are eliminated in the invention. The invention employs transistor switches in the ICs 61 and 62 which operate on the reduced voltage level of the output of the voltage regulator. Further, the inductor Part No. 6308-R8151 manufactured by Minebea in the Model No. 5920 axial fan is eliminated in the invention. Accordingly, the finished circuit board of the present invention is of reduced width when compared to earlier circuit boards such as the circuit board for the Model No. 5920. Further, an axial flow fan with reduced width is achieved.

The invention eliminates the need for large circuit components including clamping diodes and transistors by employing a voltage regulator 57. The use of the voltage regulator to step down the input voltage generates heat across the voltage regulator which must be dissipated. The housing 70 of the fan functions as a heat sink. Use of the housing 70 as the heat sink eliminates the need for a resistor of significant size for use as the heat sink for the voltage regulator. Since the housing 70 functions as a heat sink as well as an enclosure, a standard heat compound which is a heat sinking thermo-conductive adhesive such as Loctite® Thermally-Conductive Adhesive 3873 is used to transfer the heat from the voltage regulator 57 to the metal housing 70. Alternatively, or additionally, a pin may be used to secure the voltage regulator IC 57 to the housing. The pin functions to temporarily secure the voltage regulator during the curing of the heat compound. Accordingly, a fan of reduced width is achieved. In practice a fan having a one inch thickness with the same power output as the Model 5920 IMC Magnetic Corp. axial flow fan (which is two inches thick) is achieved by the present invention.

FIG. 8 is a cross-sectional view of one of the blades 11 of the preferred embodiment of the present invention and depicts the parameters which define, in part, the cross-sectional shape 14 of the blades 11 of the present invention. Each cross-section has a leading edge 16, trailing edge 18, upper surface 22, and lower surface 24. The cross-section may be further defined by the stagger angle 26, camber angle 28, chord line 32, chord length 34, camber line 36, and thickness (t) 38.

Figures 9A, 9B:
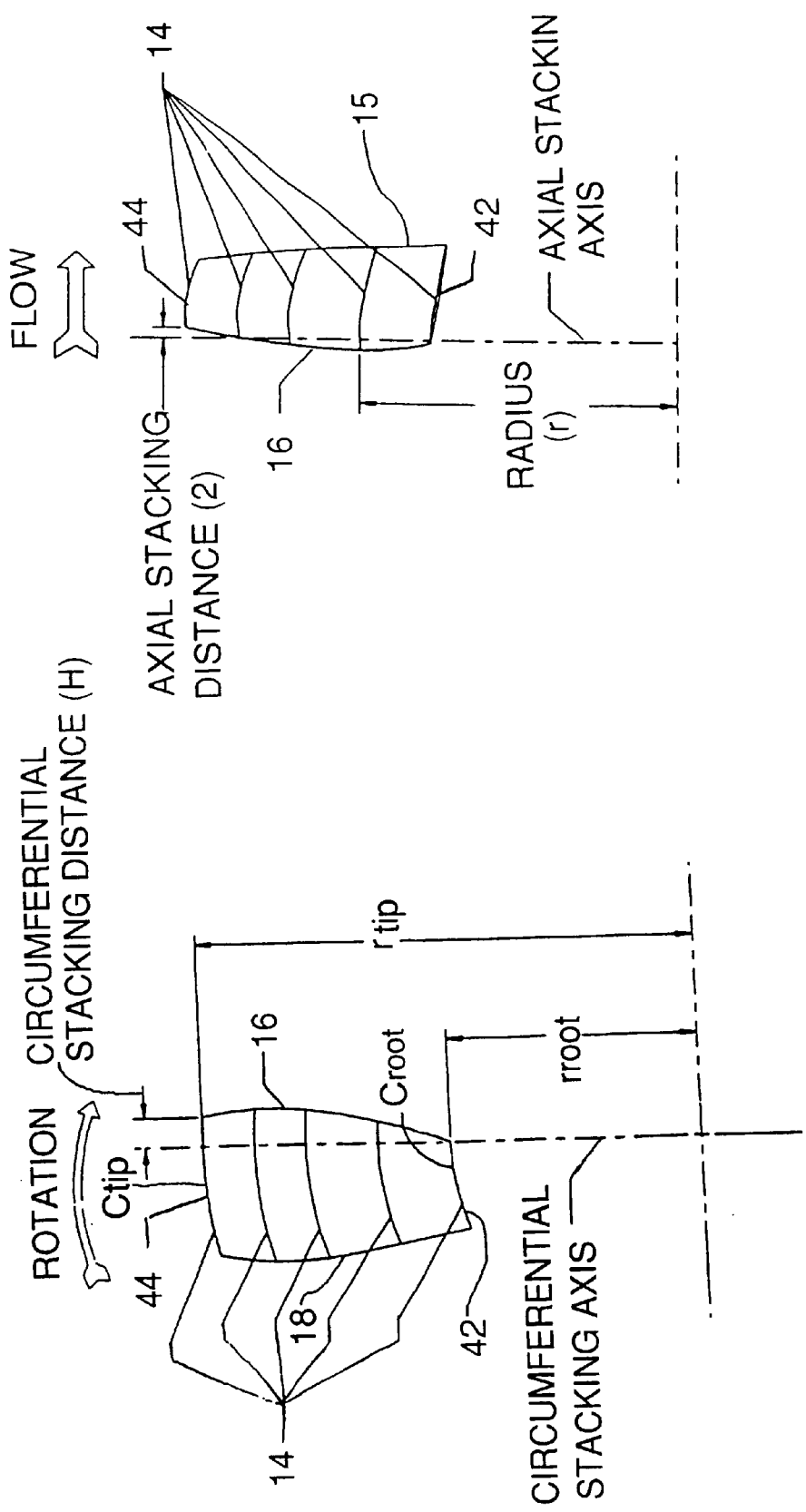
FIG. 9A is a frontal view of a blade in accordance with the present invention.
FIG. 9B is a side view of a blade in accordance with the present invention.

Referring to FIGS. 9A and 9B, blades 11 of the present invention are constructed by radially and axially stacking and blending the cross-sections 14 in order to form a three-dimensional blade 11. FIG. 9A is a frontal view of blades 11 while FIG. 9B is a side view of blades 11. Thus, the view of FIG. 9B is a rotated 90 degrees from the view of FIG. 9A. The blade has a root portion 42 and a tip portion 44. The toot portion 42 is coterminous with the circumference of circular band 12 (FIG. 1). Each airfoil section 14 of blade 11 is identified with respect to the radius which originates from the center of circular band 12 and extends radially outward as depicted in FIG. 9B. The location of each airfoil section 14 is defined by $r/r_{tip}$ which is the ratio of the radial location of the particular cross-section 14 (r) divided by the radius of the airfoil section at the tip portion 14 ($r_{tip}$) in FIGS. 9A and 9B as shown.

Figure 10:
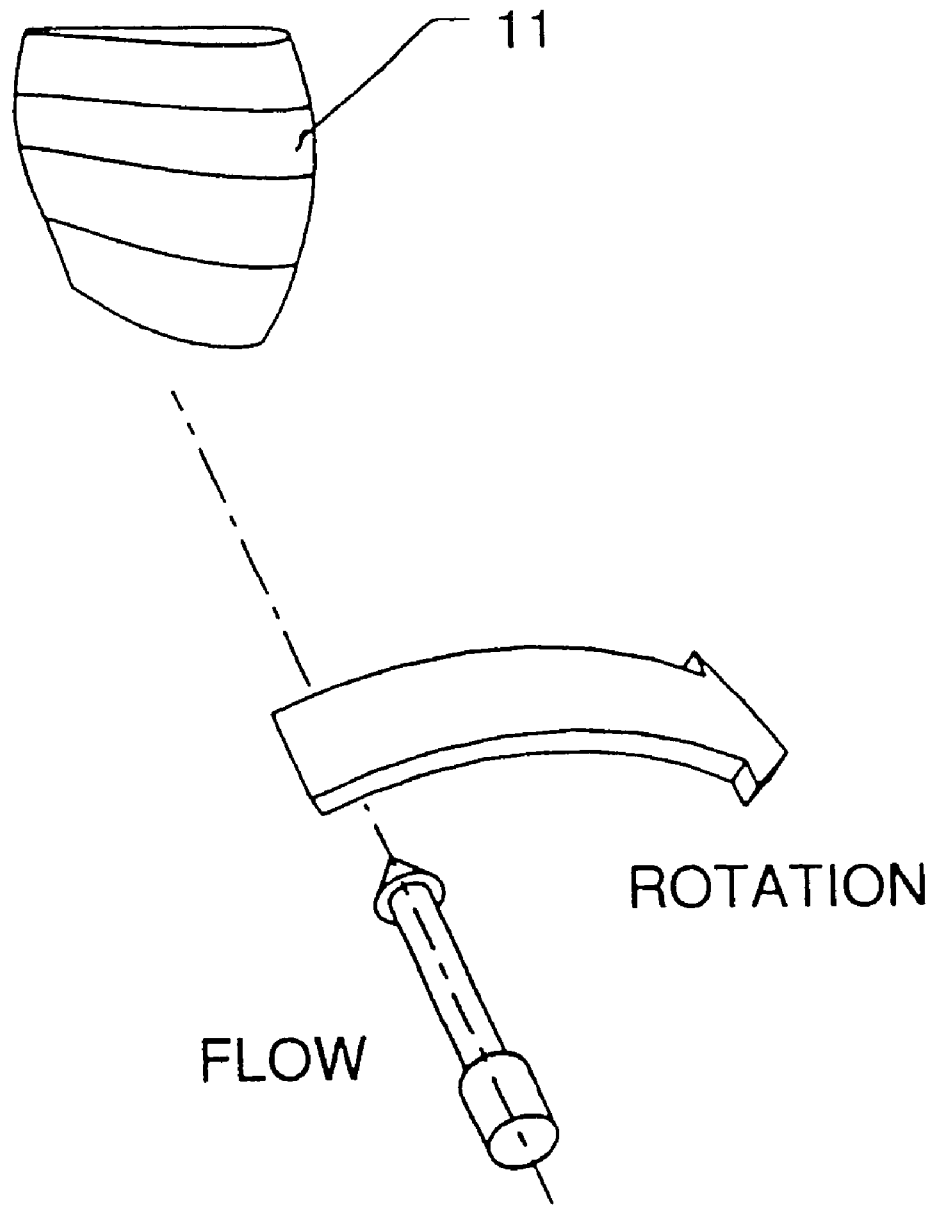
FIG. 10 is a three-dimensional view of a blade in accordance with the present invention.
Figure 11:
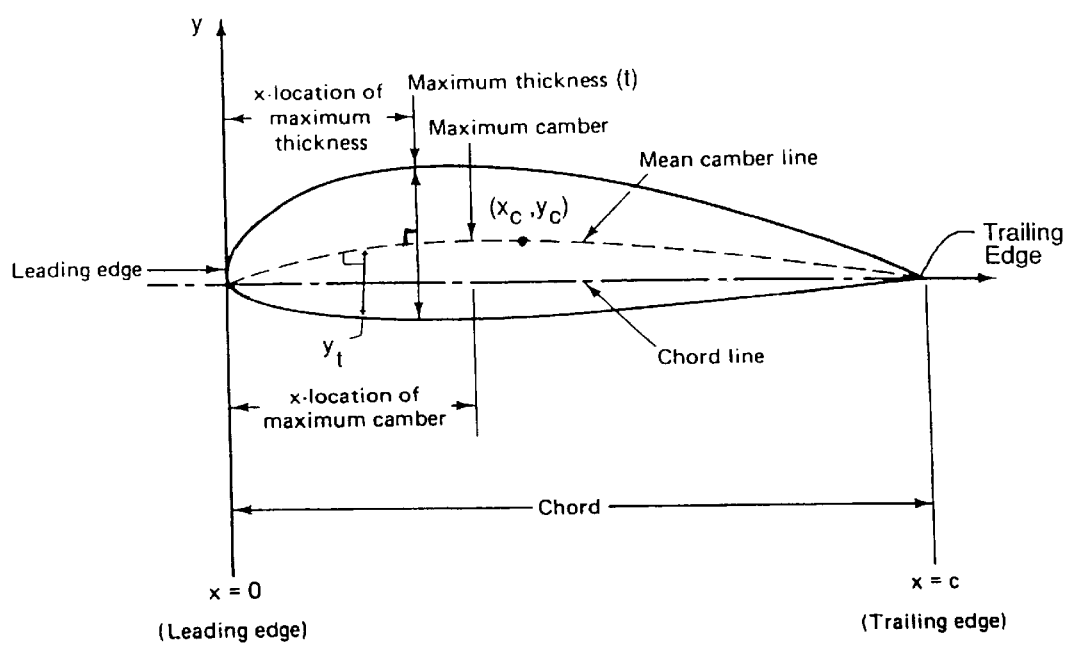
FIG. 11 is a definitional diagram of the coordinate system utilized in the description of the present invention.

The Circumferential Stacking axis is defined by an axis that intersects the leading edge 16 of cross-section 14 located at the root portion 42 and extends in the circumferential direction. Circumferential Stacking distance is defined by the distance between the leading edge 16 of an airfoil cross-section 14 and the Circumferential Stacking axis. The Axial Stacking axis is defined by an axis that intersects the leading edge 16 of the cross-section 14 located at the root portion 42 and extends in the axial direction. Axial Stacking distance is defined by the distance between the leading edge 16 of an airfoil cross-section 14 and the Axial Stacking axis. Once the cross sections 14 are stacked, a three-dimensional blade 11 results as depicted in FIG. 10. FIG. 11 is a definitional diagram showing a cross-section of a randomly chosen blade which presents the coordinate axes used to define blades 11 and cross-sectional shapes 14 of the present invention.

The blades of the present invention were designed according to the following method. A series of fan performance parameters and design constraints to be satisfied by the axial fan 100 and accompanying blades 11 were set. Fan performance parameters include volumetric flow rate at the free air condition defined in cubic feet per minute (ft³/min), shaft speed (rpm), and inlet air density in pounds per cubic feet (lbs/ft³). Design constraints include fan size (including axial width), fan weight, motor input power, and acoustic noise signature. For the preferred embodiment, these performance parameters and design constraints were set as: volumetric flow rate of 240 ft³/min, shaft speed of 3400 rpm, and inlet air density of 0.075 lbs/ft³, and axial width fan size of 1 inch. Although these are the optimum requirements, satisfactory results may be obtained for a volumetric flow rate of 225 to 255 ft³/min and a shaft speed of 3200 to 3600 rpm. Among these parameters and constraints the most important are the volumetric flow rate and axial width fan size.

For the aerodynamic design, a multi-streamline, indirect method was used to determine the optimum values of chord length 34, camber angle 28, and stagger angle 26 which are capable of delivering the specified fan performance parameters and satisfying the stated design constraints. Based on experience, the desired work distribution was selected. Work distribution is defined as the angular momentum distribution of the air flow at the outlet of the impeller 10 (trailing edge 18 of cross-section 14). The work distribution affects the size of the chord length 34. Finally, based on experience, the number of impeller blades were selected to optimize the flow output and fan width.

The next step was to determine the camber line and thickness distributions. These distributions were determined through use of Bezier curves, an example of such use is referenced in Casey, "A Computational Geometry for the Blades and Internal Flow Channels of Centrifugal Compressors", ASME 82-GT-155. This method determines the distributions in camber line and thickness in the following parametric form:

$$F(u) = \sum_{k=0}^{k=n} f_k B_k^n(u)$$

wherein
F(u) represents the solution of the Bezier curve which, in this instance is separately applied to determine the camber line x and y coordinates as well as the thickness distribution.

u is a parameter that varies linearly between 0 and 1, (u=0 at the leading edge 16 and u=1 at the trailing edge 18), $f_k$ is a one-dimensional array of Bezier control points, $B_k^n$ (u) is the Bernstein polynomial of degree n, $B_k^n$ (u)=$(_k^n)u^k(1-u)^{n-k}$, n+1 is the number of Bezier control points, and $(_k^n)$ are the binomial coefficients as defined in CRC Standard Mathematical Tables, 22nd Ed., 1974, p. 627.

In the preferred embodiment, n was chosen to be 18 so that the resultant Bezier equations were an 18th degree polynomial which resulted in 19 control points. Such a selection affords much more precision in optimizing the cross-sectional shapes 14 of the blades 11 than a lower order polynomial. The resulting equations for the Bezier curves are:

$$X_c(u) = A_0(1-u)^{18}x_0 + A_1u(1-u)^{17}x_1 + A_2u^2(1-u)^{16}x_2 +$$
$$A_3u^3(1-u)^{15}x_3 + A_4u^4(1-u)^{14}x_4 + A_5u^5(1-u)^{13}x_5 +$$
$$A_6u^6(1-u)^{12}x_6 + A_7u^7(1-u)^{11}x_7 + A_8u^8(1-u)^{10}x_8 +$$
$$A_9u^9(1-u)^9x_9 + A_{10}u^{10}(1-u)^8x_{10} + A_{11}u^{11}(1-u)^7x_{11} +$$
$$A_{12}u^{12}(1-u)^6x_{12} + A_{13}u^{13}(1-u)^5x_{13} + A_{14}u^{14}(1-u)^4x_{14} +$$
$$A_{15}u^{15}(1-u)^3x_{15} + A_{16}u^{16}(1-u)^2x_{16} + A_{17}u^{17}(1-u)x_{17} + A_{18}u^{18}x_{18}$$

$$Y_c(u) = A_0(1-u)^{18}y_0 + A_1u(1-u)^{17}y_1 + A_2u^2(1-u)^{16}y_2 +$$
$$A_3u^3(1-u)^{15}y_3 + A_4u^4(1-u)^{14}y_4 + A_5u^5(1-u)^{13}y_5 +$$
$$A_6u^6(1-u)^{12}y_6 + A_7u^7(1-u)^{11}y_7 + A_8u^8(1-u)^{10}y_8 +$$
$$A_9u^9(1-u)^9y_9 + A_{10}u^{10}(1-u)^8y_{10} + A_{11}u^{11}(1-u)^7y_{11} +$$
$$A_{12}u^{12}(1-u)^6y_{12} + A_{13}u^{13}(1-u)^5y_{13} + A_{14}u^{14}(1-u)^4y_{14} +$$
$$A_{15}u^{15}(1-u)^3y_{15} + A_{16}u^{16}(1-u)^2y_{16} + A_{17}u^{17}(1-u)y_{17} + A_{18}u^{18}y_{18}$$

$$T_n(u) = A_0(1-u)^{18}t_0 + A_1u(1-u)^{17}t_1 + A_2u^2(1-u)^{16}t_2 +$$
$$A_3u^3(1-u)^{15}t_3 + A_4u^4(1-u)^{14}t_4 + A_5u^5(1-u)^{13}t_5 +$$
$$A_6u^6(1-u)^{12}t_6 + A_7u^7(1-u)^{11}t_7 + A_8u^8(1-u)^{10}t_8 +$$
$$A_9u^9(1-u)^9t_9 + A_{10}u^{10}(1-u)^8t_{10} + A_{11}u^{11}(1-u)^7t_{11} +$$
$$A_{12}u^{12}(1-u)^6t_{12} + A_{13}u^{13}(1-u)^5t_{13} + A_{14}u^{14}(1-u)^4t_{14} +$$
$$A_{15}u^{15}(1-u)^3t_{15} + A_{16}u^{16}(1-u)^2t_{16} + A_{17}u^{17}(1-u)t_{17} + A_{18}u^{18}t_{18}$$

Wherein:
$X_c$ is the x coordinate of the camber line normalized by the chord length, $Y_c$ is the y coordinate of the camber line normalized by the chord length, $T_n$ is the thickness distribution normalized by the chord length, $A_0$ to $A_{18}$ are the Bernstein Polynomial Coefficients according to the following values:

$A_0=1$  $A_6=18564$  $A_{12}=18564$  $A_{18}=1$
$A_1=18$  $A_7=31824$  $A_{13}=8568$
$A_2=153$  $A_8=43758$  $A_{14}=3060$
$A_3=816$  $A_9=48620$  $A_{15}=816$
$A_4=3060$  $A_{10}=43758$  $A_{16}=153$
$A_5=8568$  $A_{11}=31824$  $A_{17}=18$ and $x_0$ to $x_{18}$ (hereinafter referred to as "$x_k$") are the normalized x coordinates of the Bezier control points;

$y_0$ to $y_{18}$ (hereinafter referred to as "$y_k$") are the normalized y coordinates of the Bezier control points; and $t_0$ to $t_{18}$ (hereinafter referred to as "$t_k$") are the normalized thickness control points.

Based on experience, initial values of the Bezier control points $x_k$, $y_k$, and $t_k$ were selected. With these control points, the above equations were solved for camber and thickness distributions.

Once the distributions along with the optimum chord length 34, camber angle 28, and stagger angle 26 were determined, an inviscid flow analysis was utilized to determine the surface velocity distribution on the suction (upper) side and the pressure (lower) side along with the work distribution of blade 11. The velocity distribution and resulting work distribution were viewed by the designer to verify that the work distribution profile is consistent with the initial design selection and also to assure that a favorable velocity profile had been achieved.

Figure 12:
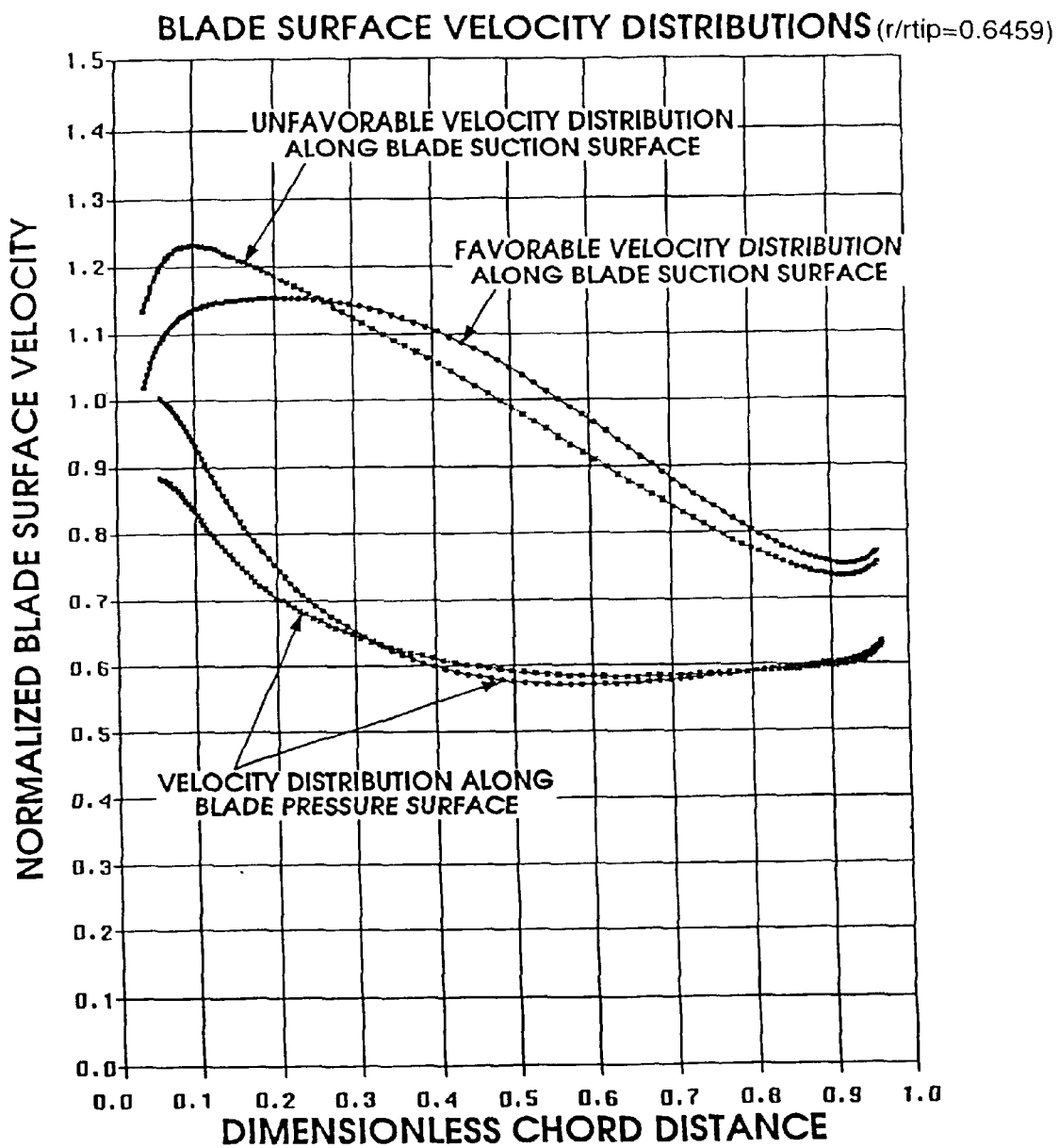
FIG. 12 is a comparison of a graphical representation of a favorable blade surface velocity distribution near design conditions in accordance with the present invention as compared to an unfavorable blade surface velocity distribution.

A typical desirable blade surface velocity distribution is sought that exhibits favorable deceleration gradients, favorable in the sense that the velocity distribution does not promote boundary layer separation and thereby weaken blade 11 performance. FIG. 12 is a comparison of a graphical representation of a favorable blade surface velocity distribution near design conditions in accordance with the present invention (at $r/r_{tip}=0.6459$) as compared to an unfavorable blade surface velocity distribution. A favorable work distribution is one that locates the maximum work distribution at a point somewhere between the root portion and the tip portion.

After the initial iteration, since the resultant velocity distribution and work distribution were unfavorable or unsatisfactory to the designer, the Bezier control points were manually varied in order to achieve different camber and thickness distributions. Once again, the velocity and work distributions were analyzed to determine if a favorable solution had been achieved. This process was repeated until a favorable solution was achieved. In the preferred embodiment, the optimized normalized Bezier control points are shown in tabular form in FIGS. 13A–C.

Figure 14:
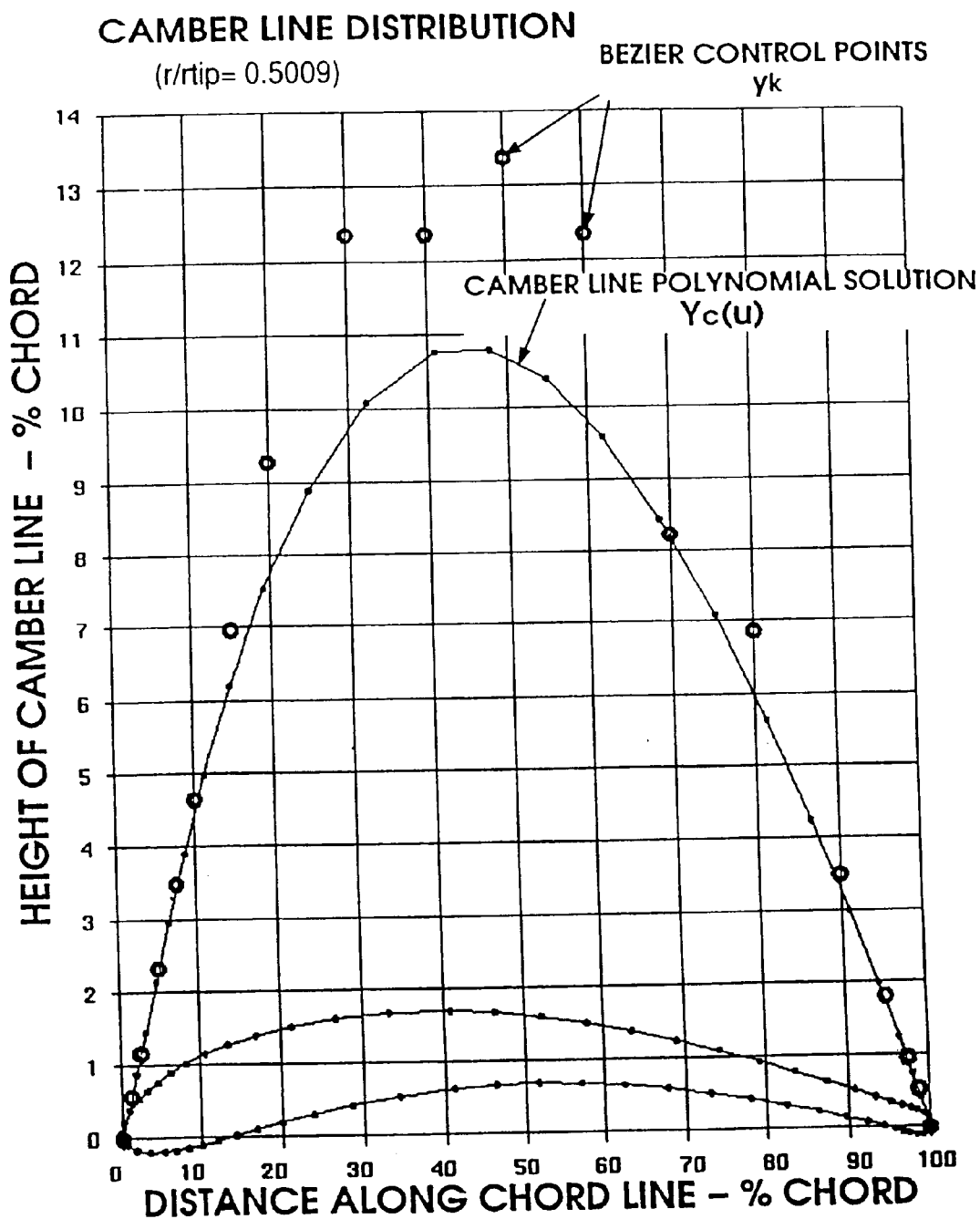
FIG. 14 is a graphical representation of the camber line distribution at the root portion of the preferred embodiment in accordance with the present invention along with the associated optimized normalized Bezier control points.
Figure 15:
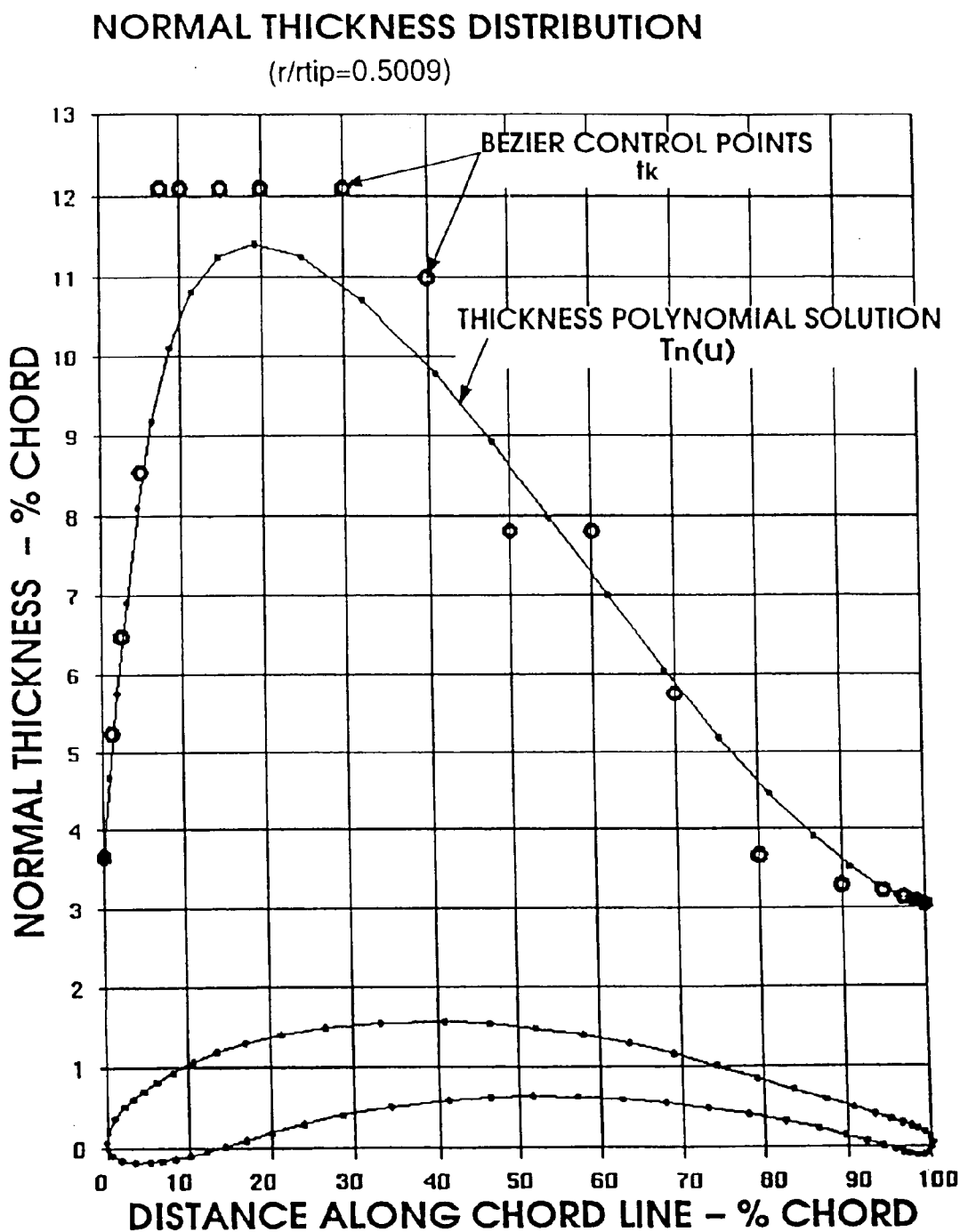
FIG. 15 is a graphical representation of the normal thickness distribution at the root portion of the preferred embodiment in accordance with the present invention along with the associated optimized normalized Bezier control points.
Figure 16:
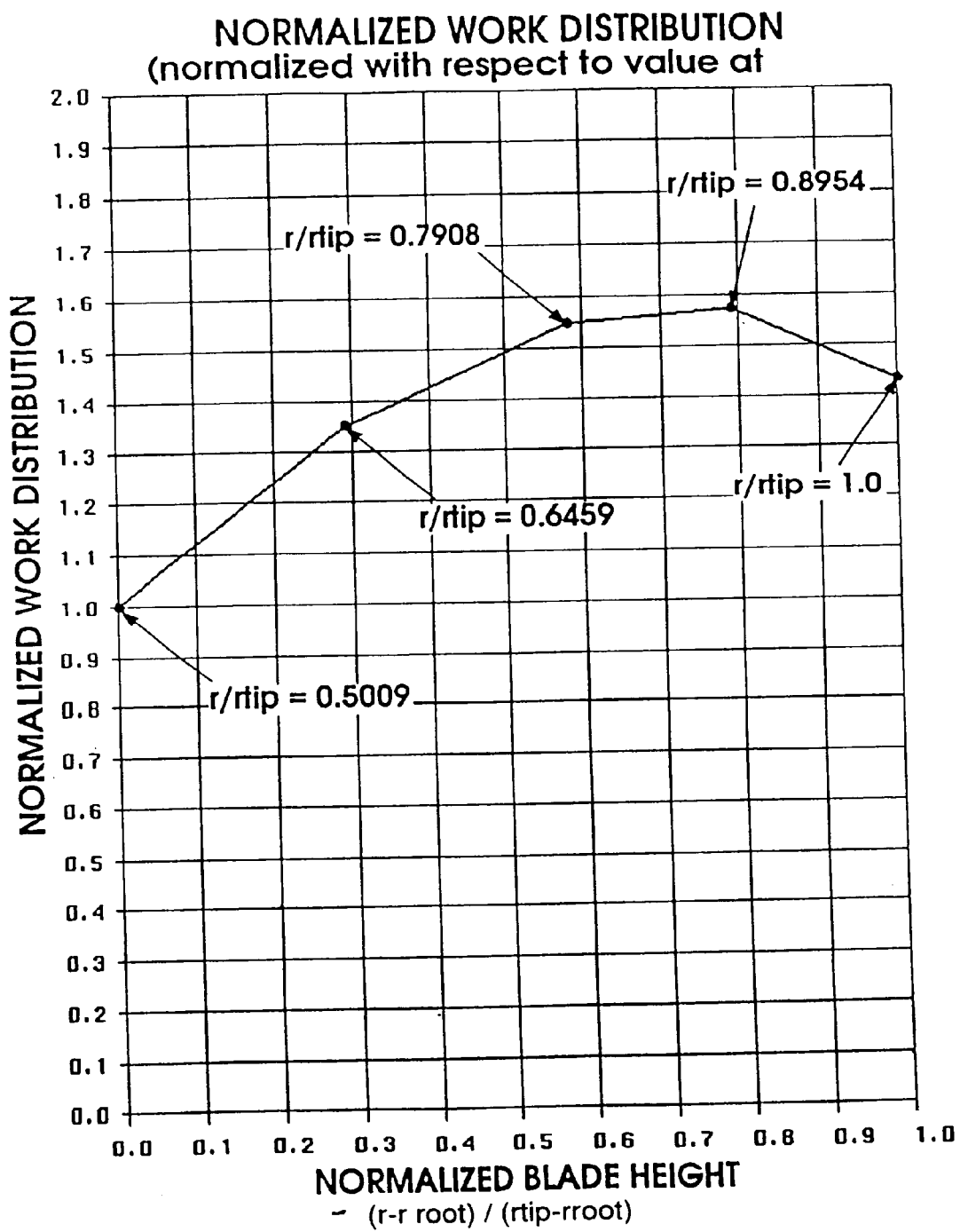
FIG. 16 is a graphical representation of the normalized work distribution of the preferred embodiment in accordance with the present invention.
Figure 17:
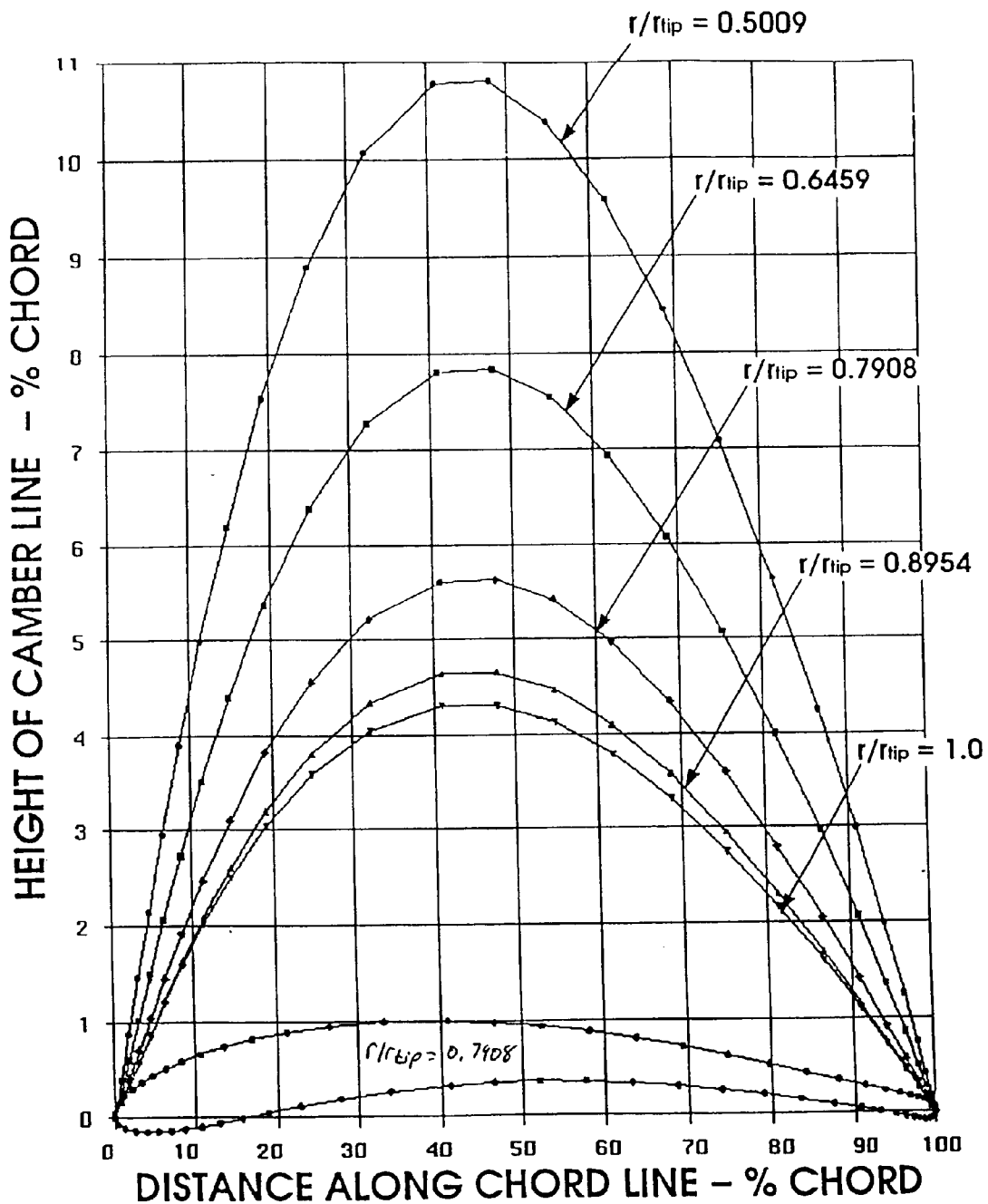
FIG. 17 is a graphical representation of the camber line distribution of the five airfoil sections of the preferred embodiment in accordance with the present invention.
Figure 18:
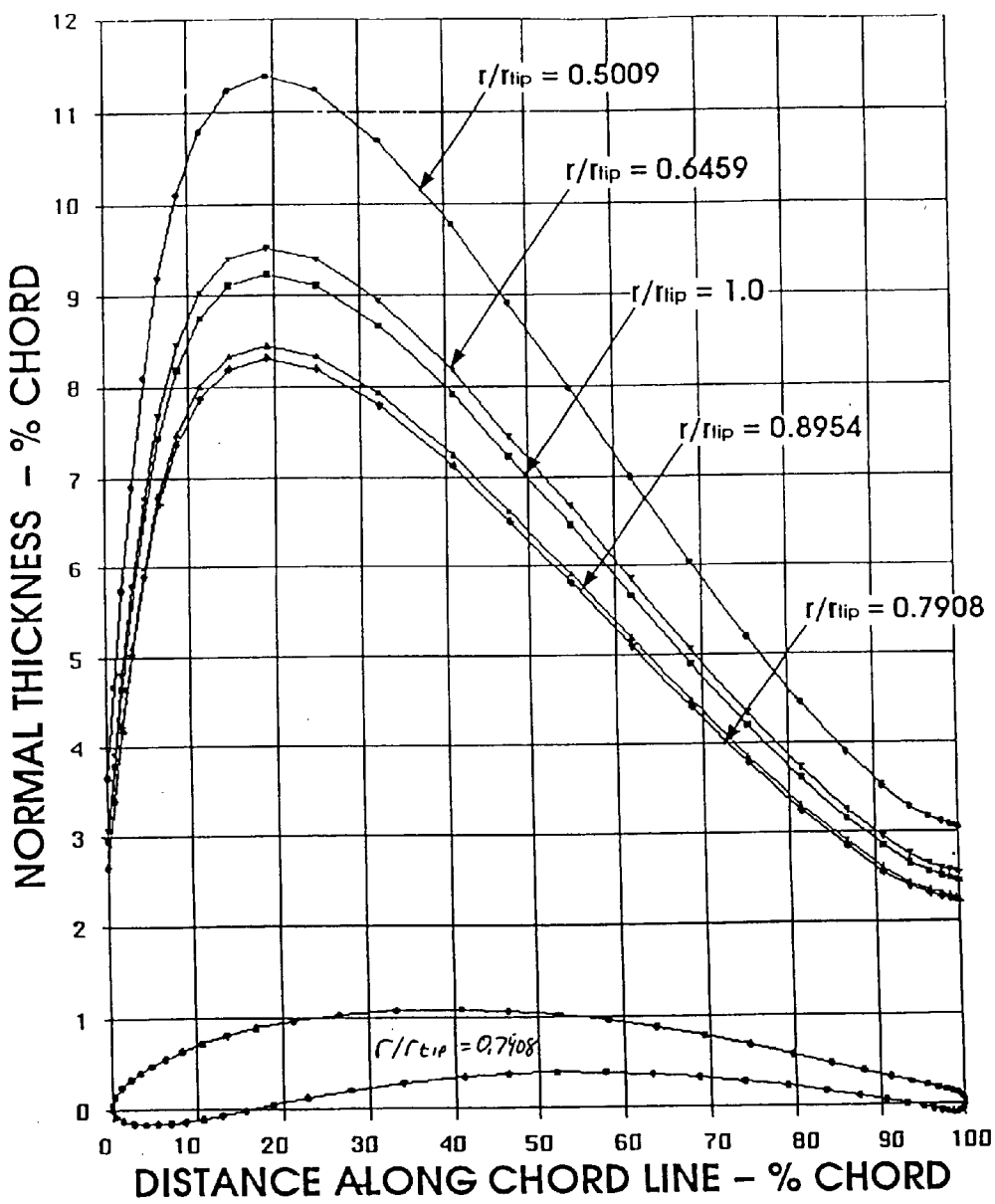
FIG. 18 is a graphical representation of the thickness distribution of the five airfoil sections of the preferred embodiment in accordance with the present invention.

These optimized Bezier control points along with the optimized camber distribution and thickness distribution for the airfoil section 14 located at the root portion 42 are graphically represented in FIGS. 14 and 15. The work distribution is graphically represented in FIG. 16 for all five of the airfoil sections 14 of the preferred embodiment. As seen in FIG. 16, the maximum work distribution is located between the root portion and the tip portion. The camber line and thickness distributions for all five of the airfoil sections 14 of the preferred embodiment are shown in FIGS. 17 and 18 along with a representation of the cross-sectional profile at $r/r_{tip}=0.7908$.

From the optimized camber line and thickness distributions, the blade surface coordinates were determined in a manner similar to that used in the NACA families of wing sections as referenced on pages 111–13 of "Theory of wing sections" by IRA H. ABBOTT and ALBERT E. VON DOENHOFF published in 1959 by the DOVER PUBLICATIONS, INC.

The blade surface coordinates are found from the chord line 32, camber line 36, and normal thickness distributions as follows:

$X_{UPPER} = X_c + X_t \sin \beta$ $Y_{UPPER} = Y_c + Y_t \cos \beta$ $X_{LOWER} = X_c + Y_t \sin \beta$ $Y_{LOWER} = Y_c - Y_t \cos \beta$ wherein:

$X_{UPPER}$, $Y_{UPPER}$, $X_{LOWER}$, and $Y_{LOWER}$ are the coordinates of the upper (suction) surface 22 and lower (pressure) surface 24 of the blade, respectively;

$X_c$ and $Y_c$ are the coordinates of the camber line 36;

$Y_t$ is one-half the thickness of the blade 11; and

Tan $\beta$ is the slope of the camber line 36 where Tan $\beta = dY_c/dX_c$.

Figure 19:
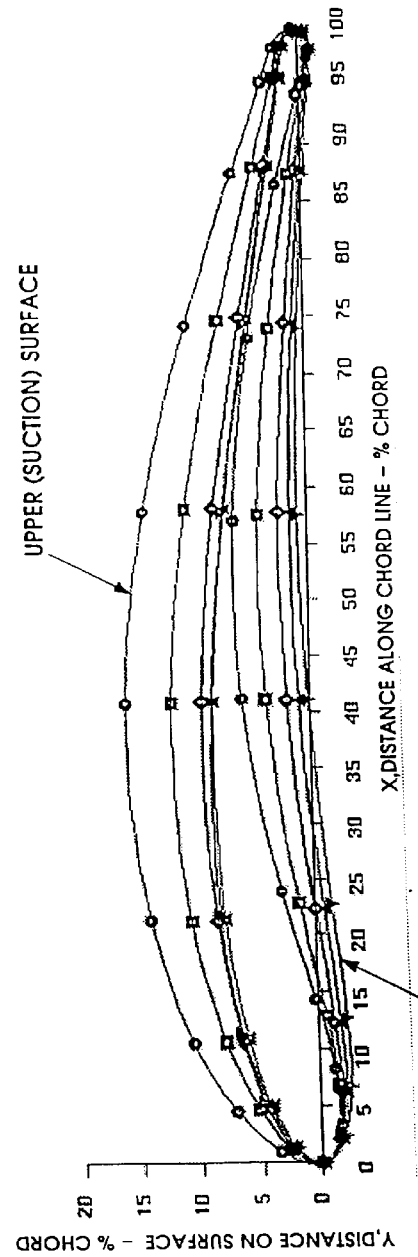
FIG. 19 is a graphical representation of the normalized profiles of the five airfoil sections of the blades of the preferred embodiment in accordance with the present invention.

The normalized cross-sectional profiles for the preferred embodiment are shown plotted in FIG. 19. FIGS. 21A–E are tabular representations of surface coordinates of the preferred embodiment in non-dimensional values.

Once the desired cross-sections 14 are found at each radial location, a three-dimensional blade 11 is formed by stacking circumferentially and axially each of the five cross-sections 14, with each cross-section 14 offset from the root portion 42 by the prescribed stacking distance. The five cross-sections 14 are blended in a smooth and continuous manner. The resulting optimum values for the five cross-sectional profiles are presented in FIG. 20. The key defining parameters are a maximum thickness located substantially constantly between about 19% chord to about 20% chord and a maximum camber located substantially constantly between about 45% chord to about 46% chord. Although these are the optimum range of values, there is an extended range of values which will substantially meet the performance parameters and design constraints in a satisfactory, although not optimum, manner. These values are a maximum thickness located substantially constantly between about 16% chord to about 23% chord and a maximum camber located substantially constantly between 40% and 51% chord.

Also seen in FIG. 20 are other key defining parameters for each cross-sectional profile such as the maximum thickness and maximum camber height (both displayed in inches and as a percentage of the chord length at the particular radial station), camber angle, stagger angle, radius, chord length, and circumferential and axial stacking distances. The maximum thickness in inches for each cross-sectional profile is characterized by a constant value. The maximum thickness as a percentage of chord length varies from a maximum value at the root portion decreasing in value to a minimum value located substantially between 79% to about 90% of a radius measured from the center of the impeller to the tip portion followed by an increase in value to the tip portion of the blade. The maximum camber height, both in inches and as a percentage of the chord length at the particular radial station, varies from a maximum camber height at the root portion continuously decreasing in maximum camber height to the tip portion of the blade.

The camber angle is characterized by a maximum value at the root portion continuously decreasing in value to the tip portion of the blade. The stagger angle, on the other hand, is characterized by a minimum value at the root portion continuously increasing in value to the tip portion of the blade. In addition, the cross-sectional profile of blades 11 may be described by its geometrical shape with the leading edge being similar to a parabola in shape, a convex upper surface, and a lower surface which is convex towards the leading edge and concave towards the trailing edge.

Other parameters in FIG. 20 include the aspect ratio and the solidity. The aspect ratio is defined as the length of the blade divided by the chord at the particular cross-section in dimensionless units. The length of the blade is defined as the radius at the tip portion ($r_{tip}$) minus the radius at the root portion ($r_{root}$). The solidity is defined as the chord length at the particular radial station divided by the blade spacing in dimensionless units. The blade spacing is the distance between adjacent blades at a given radius and is further defined by dividing $2\pi r$ by the number of blades. Finally, the normalized radius, normalized chord, and normalized circumferential and axial stacking distances are presented in FIG. 20 which are all defined in dimensionless units by dividing the value of the parameter at a particular radius station by the maximum value of that parameter.

To summarize, the present invention provides an axial flow fan with novel circuitry and housing, and a novel blade consisting of a plurality of airfoil sections blended together which allow the axial width of an axial flow fan to be reduced while maintaining the desired performance parameters and design constraints.

Now that the preferred embodiments of the present invention have been shown and described in detail, various modifications and improvements thereon will become readily apparent to those skilled in the art. For example, minor deviations from the disclosed values and approximations of the disclosed equations are intended to be within the spirit of the invention. Further, minor deviations or differences due to blending of the cross-sectional designs or due to different blending approaches are intended to be within the spirit and scope of the invention. A viable product may be obtained for substantially the same performance parameters and design constraints, or where differences in the performance parameters and design constraints have little commercial significance, by varying the methods of design in minor ways such as choosing a different value for the number of control points, choosing a different value for the number of cross-sectional profiles, choosing a different value for the number of blades, defining the cross-sectional profiles by different radial distances, or choosing a different stacking distance, stagger angle, camber angle, or chord length, where the differences in values are minor. The drawings and descriptions of the preferred embodiments are made by way of example rather than to limit the scope of the inventions, and they are intended to cover, within the spirit and scope of the inventions, all such changes and modifications stated above.

What is claimed is:

1. A method for determining an optimum camber line and thickness distributions in a blade for an impeller having a root portion, a tip portion, a leading edge and a trailing edge, comprising the steps of:

determining a series of fan performance parameters and design constraints;

utilization of Bezier curves to determine the appropriate camber line and thickness distributions utilizing the equation $$F(u) = \sum_{k=0}^{k=n} f_k B_k^n(u)$$

wherein

F(u) represents the solution of the Bezier curve;

u is a parameter that varies linearly between 0 and 1, (u=0 at the leading edge and u=1 at the trailing edge);

$f_k$ is a one-dimensional array of Bezier control points;

$B_k^n(u)$ is the Bernstein polynomial of degree n;

$B_k^n(u) = \binom{n}{k} u^k (1-u)^{n-k}$;

n+1 is the number of Bezier control points, and $\binom{n}{k}$ are the binomial coefficients as defined in CRC Standard Mathematical Tables, 22nd Ed., 1974, p. 627;

initial values of the Bezier control points are selected;

F(u) is separately applied to determine the camber line x and y coordinates as well as the thickness distribution;

conducting an inviscid flow analysis of the to determine a surface velocity distribution and work distribution for the resultant camber line and thickness distributions;

altering the Bezier control points, acquiring different camber and thickness distributions, repeating the process until a favorable solution is achieved.

2. The method disclosed in claim 1 wherein:

the fan performance parameters include a volumetric flow rate, a shaft speed and inlet air density.

3. The method disclosed in claim 1 wherein:

the design constraints include fan size, fan weight, motor input power, and acoustic noise signature.

4. The method disclosed in claim 1 wherein:

the fan performance parameters include a volumetric flow rate, a shaft speed and inlet air density; and the design constraints include fan size, fan weight, motor input power, and acoustic noise signature.

5. The method disclosed in claim 4 wherein:

the volumetric flow rate is approximately 225 to 255 ft³/min; and the shaft speed is approximately 3200 to 3600 rpm.

6. The method disclosed in claim 4 wherein:

the volumetric flow rate is approximately 240 ft³/min;

the shaft speed is approximately 3400 rpm;

inlet air density is approximately 0.075 lbs/ft³; and the axial width of the fan is approximately 1 inch.

7. The method disclosed in claim 1 wherein:

n is chosen to be 18 so that the resultant Bezier equations are an 18$^{th}$ degree polynomial.

8. The method disclosed in claim 1 wherein:

the surface velocity distribution does not promote boundary layer separation.

9. The method disclosed in claim 1 wherein:

the work distribution locates the maximum work distribution at a point between the root portion and the tip portion.

* * * * *